(12) United States Patent
Yu et al.

(10) Patent No.: US 11,815,853 B2
(45) Date of Patent: Nov. 14, 2023

(54) PVH IN-BAND CHROMATIC CORRECTION USING METASURFACE

(71) Applicant: Meta Platforms Technologies, LLC, Menlo Park, CA (US)

(72) Inventors: Hao Yu, Kent, OH (US); Dianmin Lin, Los Altos, CA (US); Lu Lu, Kirkland, WA (US); Xiayu Feng, Kent, OH (US); Mengfei Wang, Kirkland, WA (US); Barry David Silverstein, Kirkland, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 246 days.

(21) Appl. No.: 17/322,453

(22) Filed: May 17, 2021

(65) Prior Publication Data
US 2022/0365482 A1 Nov. 17, 2022

(51) Int. Cl.
*G03H 1/02* (2006.01)
*G02B 27/00* (2006.01)
(Continued)

(52) U.S. Cl.
CPC ....... *G03H 1/0248* (2013.01); *G02B 27/0025* (2013.01); *G02B 27/0172* (2013.01);
(Continued)

(58) Field of Classification Search
CPC .. G03H 1/0248; G03H 1/18; G03H 2001/185; G02B 27/0025; G02B 27/0172;
(Continued)

(56) References Cited

U.S. PATENT DOCUMENTS

2020/0153203 A1 5/2020 Hatzilias et al.
2020/0355913 A1* 11/2020 Park .................... G02B 5/1809
(Continued)

OTHER PUBLICATIONS

Aieta F., et al., "Achromatic Metasurfaces by Dispersive Phase Compensation," 2015 IEEE Photonics Conference (IPC), Oct. 4, 2015, pp. 202-203.
(Continued)

*Primary Examiner* — Arnel C Lavarias
(74) *Attorney, Agent, or Firm* — Weaver Austin Villeneuve & Sampson LLP

(57) ABSTRACT

An optical device includes an optical component (e.g., a polarization volume hologram, a geometric phase device, or a polarization-insensitive diffractive optical element) having a uniform thickness and configured to modify a wavefront of a light beam that includes light in two or more wavelengths visible to human eyes, where the optical component has a chromatic aberration between the two or more wavelengths. The optical device also includes a metasurface on the optical component. The metasurface includes a plurality of nanostructures configured to modify respective phases of incident light at a plurality of regions of the metasurface, where the plurality of nanostructures is configured to, at each region of the plurality of regions, add a respective phase delay for each of the two or more wavelengths to correct the chromatic aberration between the two or more wavelengths.

17 Claims, 25 Drawing Sheets

(51) Int. Cl.
    *G02B 27/01* (2006.01)
    *G03H 1/18* (2006.01)
(52) U.S. Cl.
    CPC ....... *G03H 1/18* (2013.01); *G02B 2027/0174* (2013.01); *G02B 2027/0178* (2013.01); *G03H 2001/185* (2013.01)
(58) Field of Classification Search
    CPC .... G02B 2027/0174; G02B 2027/0178; G02B 1/00; G02B 1/002; G02B 5/18; G02B 2005/1804; G02B 5/1809; G02B 5/1814; G02B 5/1828; G02B 5/1833; G02B 5/1861; G02B 5/1866; G02B 5/1871; G02B 5/32; G02B 27/0037; G02B 27/005; G02B 27/0056; G02B 27/0101; G02B 27/0103; G02B 2027/011
    USPC ........ 359/3, 1, 8, 13, 14, 15, 16, 19, 32, 33, 359/34, 558, 566, 569, 570, 572, 573, 359/574, 575, 576
    See application file for complete search history.

(56) References Cited

U.S. PATENT DOCUMENTS

| | | | |
|---|---|---|---|
| 2021/0044748 A1* | 2/2021 | Hu | H04N 23/698 |
| 2021/0103075 A1* | 4/2021 | Park | G02B 5/1814 |
| 2022/0082794 A1* | 3/2022 | Kim | G02B 27/0025 |

OTHER PUBLICATIONS

Aieta F., et al., "Multiwavelength Achromatic Metasurfaces By Dispersive Phase Compensation," Science, Feb. 19, 2015, vol. 347, No. 6228, 21 pages.
Anandhimeena B., et al., "Compact Metamaterial Antenna with High Directivity for Bio-Medical Systems," Circuits and Systems, Oct. 31, 2016, vol. 07, No. 12, pp. 4036-4045.
Ballard Z.S., et al., "Off-Axis Holography and Micro-Optics Improve Lab-On-A-Chip Imaging," Light: Science & Applications, Sep. 22, 2017, vol. 06, 2 pages.
Balli F., et al., "A Hybrid Achromatic Metalens," arxiv.org, Cornell University Library, Sep. 17, 2019, 20 pages.
Briqech Z., et al., "Wide-scan MSC-AFTSA Array-Fed Grooved Spherical Lens Antenna for Millimeter-Wave Mimo Applications," IEEE Transactions on Antennas and Propagation, Jul. 2016, vol. 64, No. 7, 9 pages.
Chen M., et al., "Method Of Pupil Shaping For Off-Axis Illumination In Optical Lithography," Journal of Optical Technology, Mar. 2016, vol. 83, No. 03, pp. 154-158.
Chen W.T., et al., "A Broadband Achromatic Polarization-Insensitive Metalens Consisting of Anisotropic Nanostructures," Nature Communications, Jan. 21, 2019, vol. 10, 8 pages.
Chernomyrdin N.V., et al., "Wide-Aperture Aspherical Lens for High-Resolution Terahertz Imaging," Review of Scientific Instruments, Jan. 12, 2017, vol. 88, No. 01, 6 pages.
Feng X., et al., "Closer Look at Transmissive Polarization Volume Holograms: Geometry, Physics, and Experimental Validation," Applied Optics, Jan. 20, 2021, vol. 60, No. 03, pp. 580-592.
International Search Report and Written Opinion for International Application No. PCT/US2022/029335 dated Aug. 10, 2022, 14 pages.
Joo K., et al., "Light-Field Camera for Fast Switching of Time-Sequential Two-Dimensional and Three-Dimensional Image Capturing at Video Rate," IEEE Transactions on Industrial Electronics, Aug. 2020, vol. 67, No. 8, pp. 6975-6985.
Koonen T., et al., "High-Capacity Optical Wireless Communication Using Two-Dimensional IR Beam Steering," Journal of Lightwave Technology, Oct. 1, 2018, vol. 36, No. 19, pp. 4486-4493.
Lee Y.H., et al., "Optical Properties of Reflective Liquid Crystal Polarization Volume Gratings," Journal of the Optical Society of America B, May 2019, vol. 36 (5), 4 pages.
Lee Y.H., et al., "Reflective Polarization Volume Gratings for High Efficiency Waveguide-Coupling Augmented Reality Displays," Optics Express, Oct. 30, 2017, vol. 25, No. 22, 7 pages.
Lin D., et al., "Dielectric Gradient Metasurface Optical Elements," Science, Jul. 18, 2014, vol. 345, No. 6194, pp. 298-302.
Lopez J.J., et al., "Planar-lens Enabled Beam Steering for Chip-Scale LIDAR," 2018 Conference on Lasers and Electro-Optics (CLEO), May 13, 2018, 2 pages.
Moon S., et al., "Compact Augmented Reality Combiner Using Pancharatnam-Berry Phase Lens," IEEE Photonics Technology Letters, vol. 32, No. 5, Mar. 1, 2020, pp. 235-238.
Oliker V., "A Piano-Freeform Lens Pair for Shaping Laser Beam," Proceedings vol. 10758, Nonimaging Optics: Efficient Design for Illumination and Solar Concentration XV, Sep. 14, 2018, 5 pages.
Shen Z., et al., "Liquid Crystal Integrated Metalens with Tunable Chromatic Aberration," Advanced Photonics, May 12, 2020, vol. 02, No. 03, 7 pages.
Volkel R., et al., "Microlens Array Imaging System for Photolithography," Optical Engineering, Nov. 1996, vol. 35, No. 01, pp. 3323-3330.
Weng Y., et al., "Polarization Volume Grating with High Efficiency and Large Diffraction Angle," Optics Express (OSA), Aug. 8, 2016, vol. 24, No. 16, pp. 17746-17759.
Wu R., et al., "Improved Illumination System Of Laparoscopes Using An Aspherical Lens Array," Biomedical Optics Express, Jun. 1, 2016, vol. 07, No. 06, 12 pages.
Yamagishi F., et al., "Chromatic Aberration-Free Grating-Lens Pair," Proceedings of SPIE Current Developments in Optical Engineering III, Jan. 27, 1989, vol. 965, pp. 52-56.
Ye M., et al., "Achromatic Flat Subwavelength Grating Lens Over Whole Visible Bandwidths," IEEE Photonics Technology Letters, May 15, 2018, vol. 30, No. 10, 4 pages.
Zhan T., et al., "Planar Optics Enables Chromatic Aberration Correction in Immersive Near-Eye Displays," SPIE Proceedings, [Proceedings of SPIE ISSN 0277-786X], vol. 11310, Feb. 19, 2020, 8 pages.
Zhan T., et al., "Practical Chromatic Aberration Correction in Virtual Reality Displays Enabled by Cost-Effective Ultra-Broadband Liquid Crystal Polymer Lenses," Advanced Optical Materials, Oct. 2019, 5 pages.
Zhang Z., et al., "Recent Advancement On Micro-/Nano-Spherical Lens Photolithography Based On Monolayer Colloidal Crystals," Advances in Colloid and Interface Science, Feb. 2016, vol. 228, 41 pages.
Zhou X.T., et al., "Design and Fabrication of Square Micro-Lens Array for Integral Imaging 3D Display," Optik, Mar. 2018, vol. 157, pp. 532-539.
Zhou Y., et al., "Characteristic Analysis of Compact Spectrometer Based on Off-Axis Meta-Lens," Applied Sciences, Feb. 26, 2018, vol. 08, No. 03, 11 pages.
Zhu Z., et al., "Free-Form Surface Generation In A Double Pole Coordinate System For Off-Axis Illumination Application," Applied Optics, Feb. 1, 2017, vol. 56, No. 04, pp. 771-776.
Zimmermann M., et al., "Microlens Laser Beam Homogenizer: From Theory to Application," Proceedings of SPIE Laser Beam Shaping VIII, Sep. 26, 2007, vol. 6663, 13 pages.

* cited by examiner

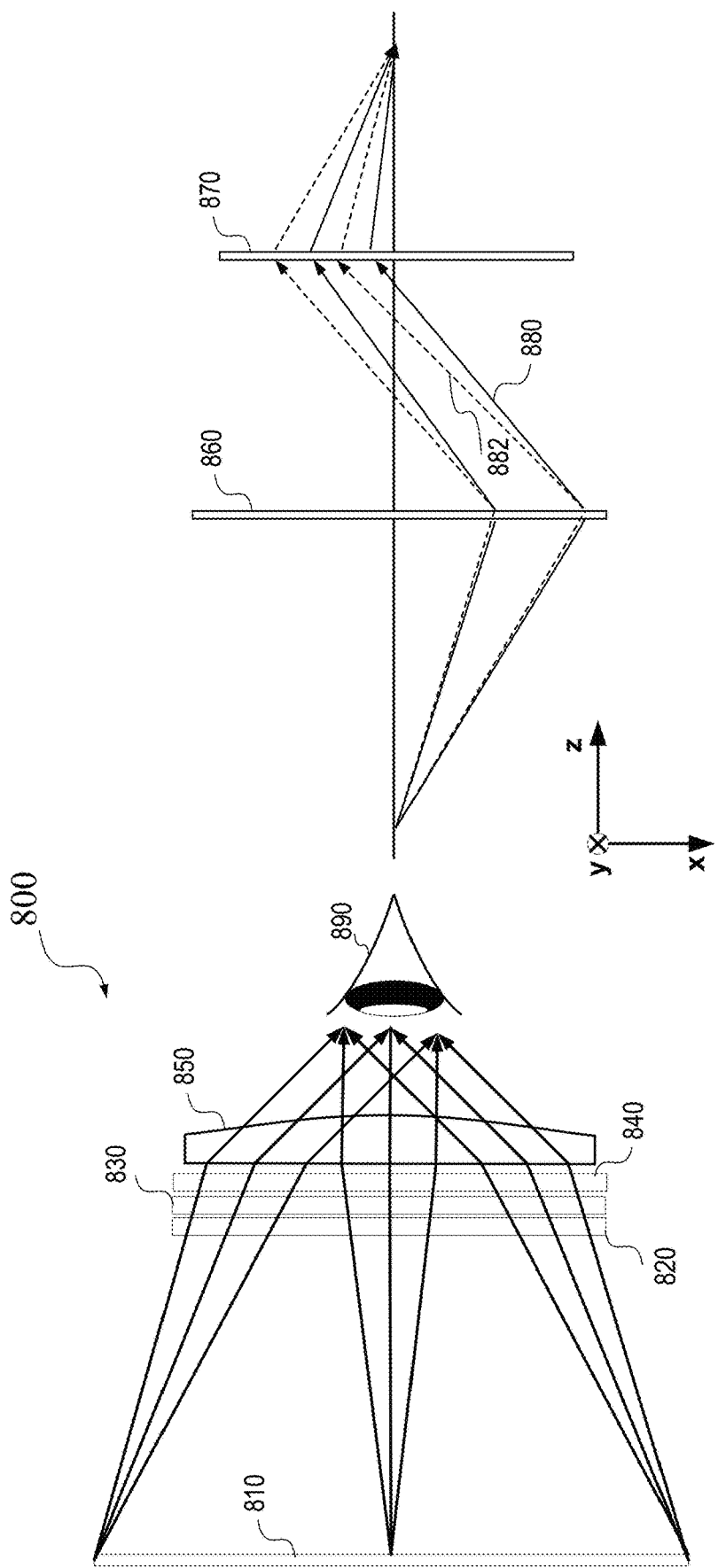

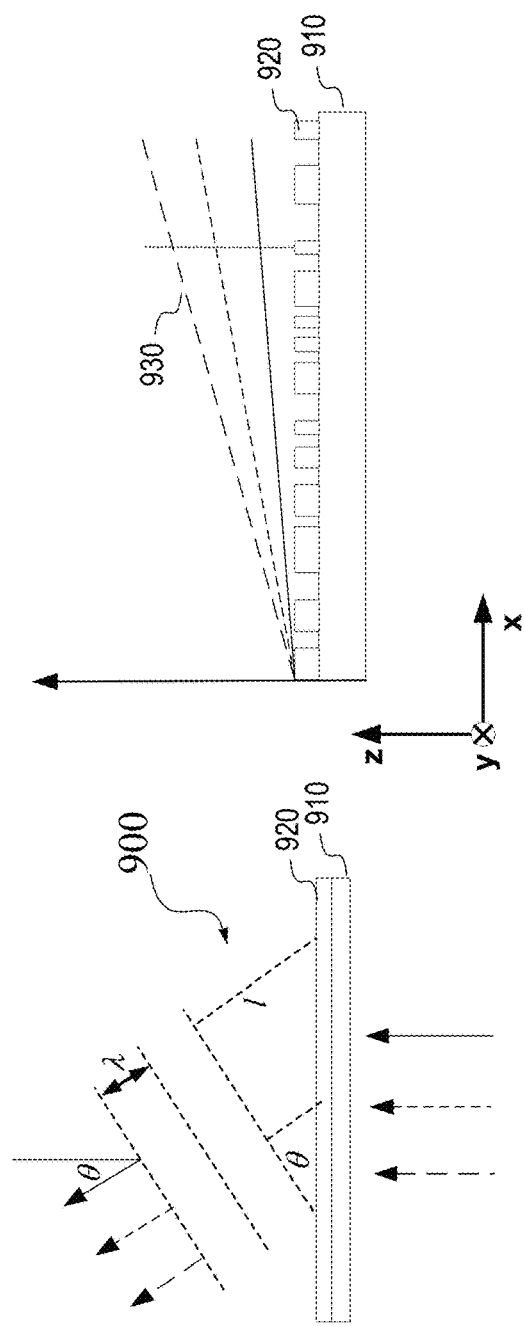
*FIG. 9A*    *FIG. 9B*    *FIG. 9C*

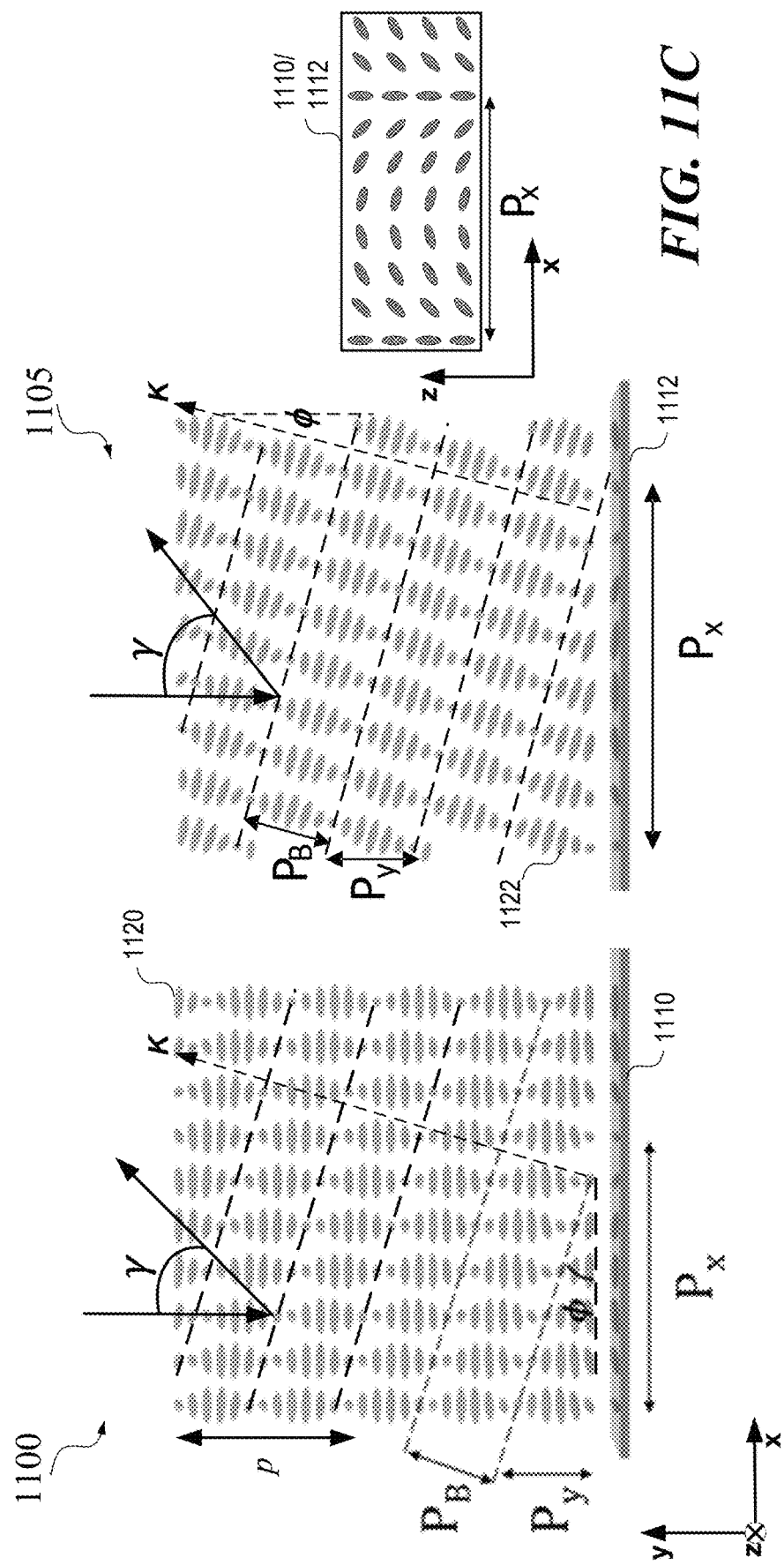

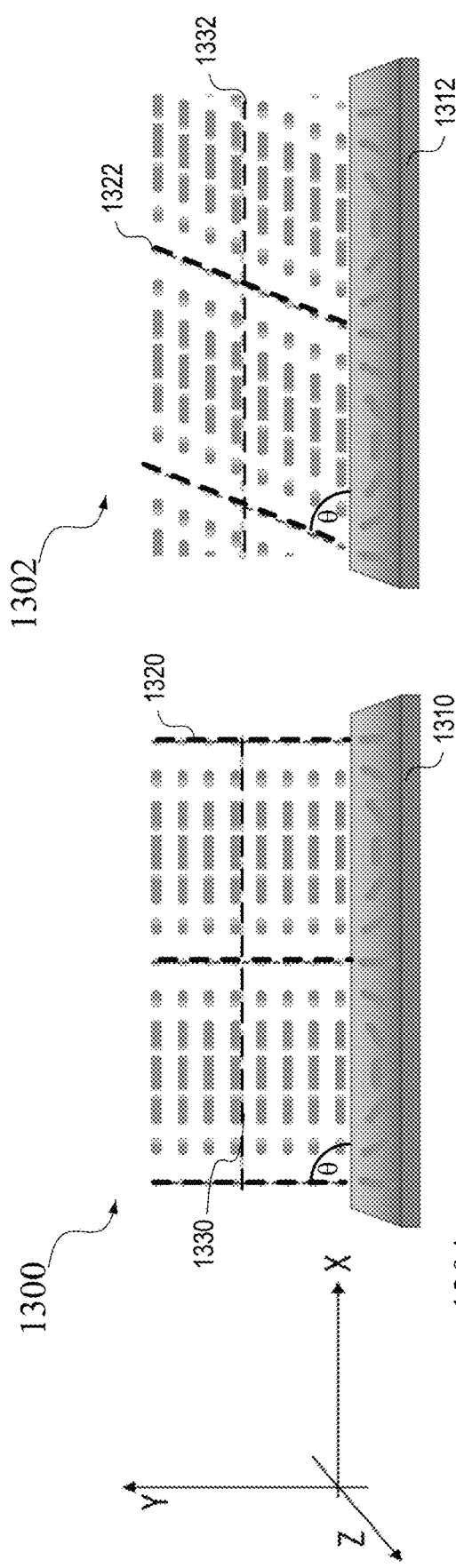
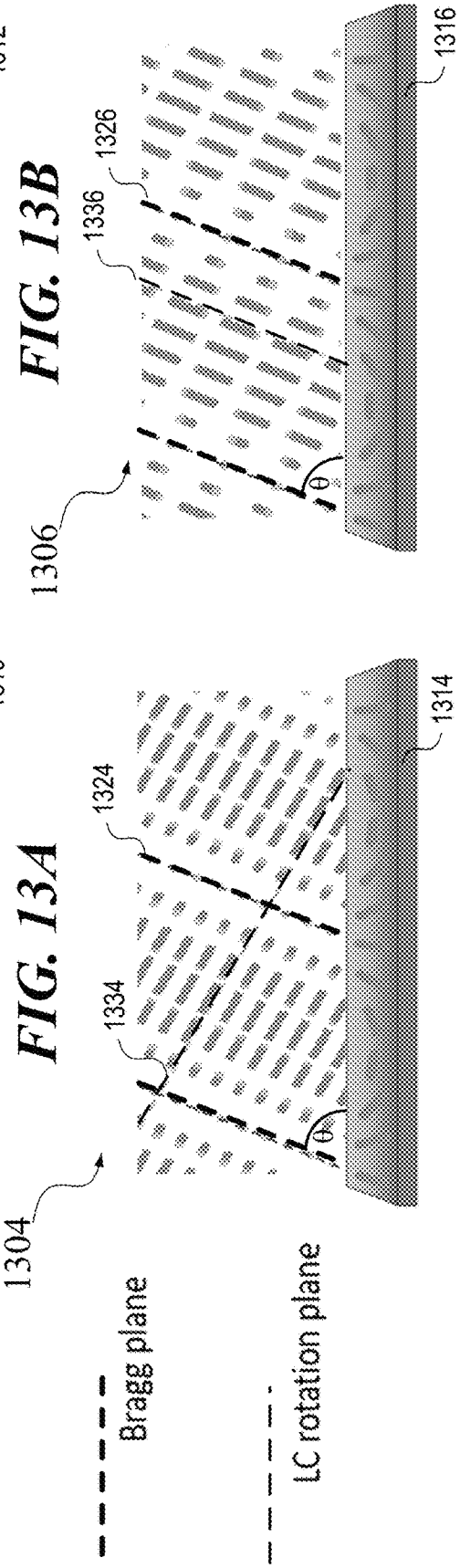
FIG. 13A FIG. 13B FIG. 13C FIG. 13D

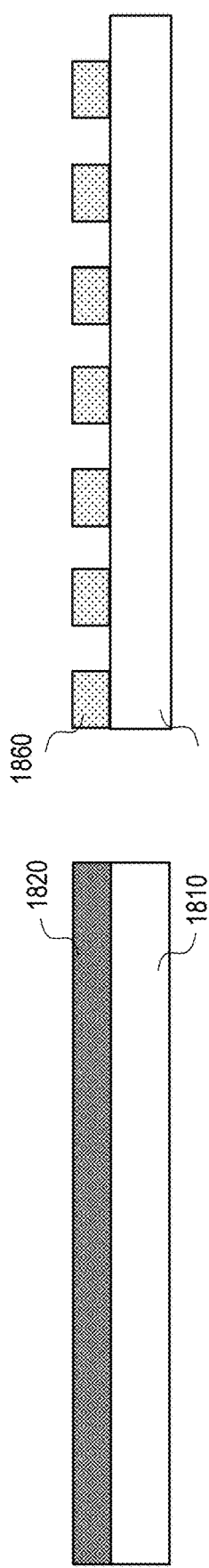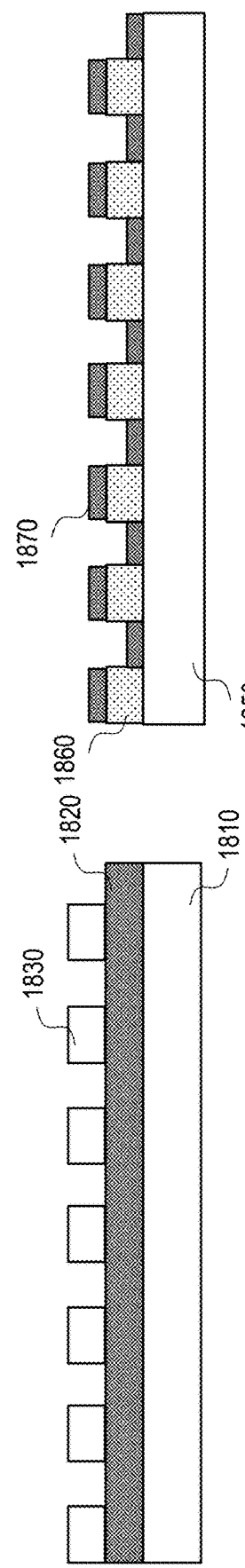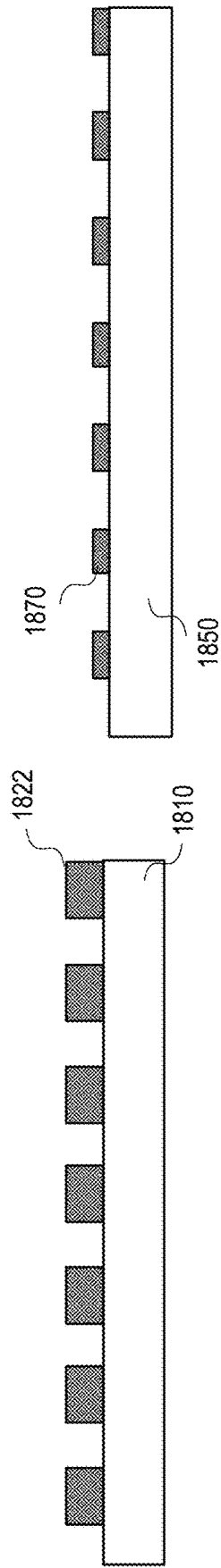

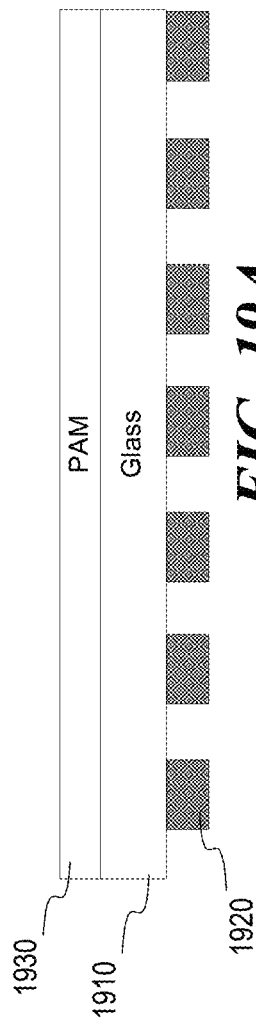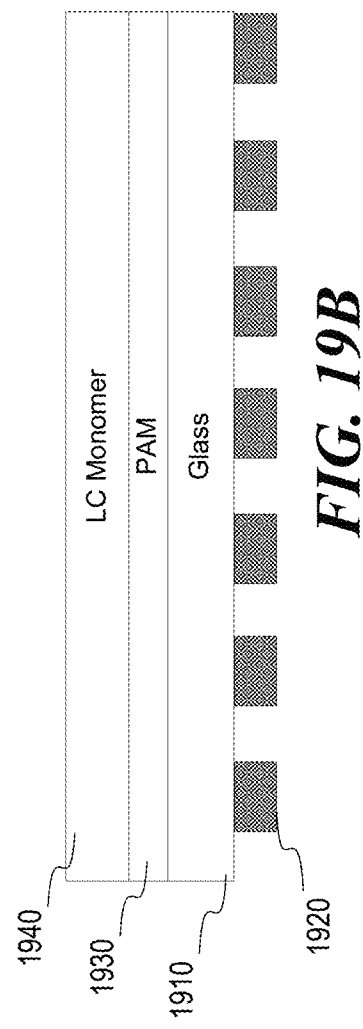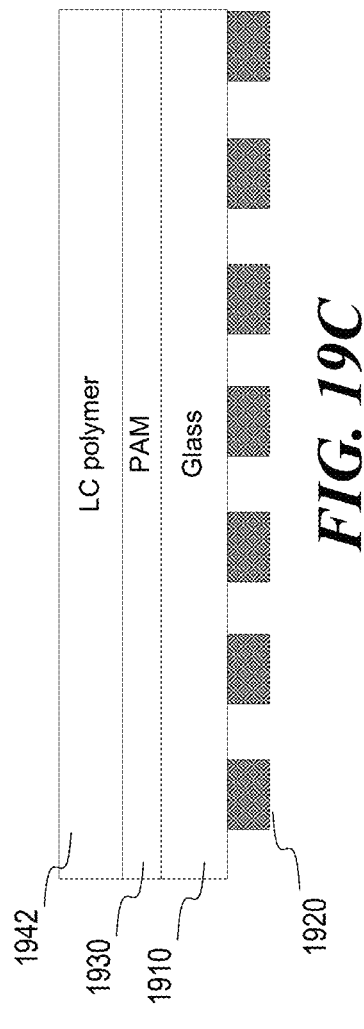

PVH IN-BAND CHROMATIC CORRECTION USING METASURFACE

BACKGROUND

A head-mounted display (HMD) or heads-up display (HUD) system generally includes a near-eye display (e.g., in the form of a headset or a pair of glasses) configured to present content to a user via an electronic or optic display that is within, for example, about 10-20 mm in front of user's eyes. The near-eye display may display virtual objects or may combine images of real objects with virtual objects, as in virtual reality (VR), augmented reality (AR), or mixed reality (MR) applications. For example, in some VR or AR systems, light of displayed images may be projected onto the user's eyes by projection optics (e.g., a lens), such that the images may appear to be at a longer distance from user's eyes. In an AR system, a user may view both images of virtual objects (e.g., computer-generated images (CGIs)) and the surrounding environment by, for example, seeing through transparent display glasses or lenses (often referred to as optical see-through). One example of an optical see-through AR system may use a waveguide-based optical display, where light of projected images may be coupled into a waveguide (e.g., a transparent substrate), propagate within the waveguide, and be coupled out of the waveguide at multiple locations towards an eyebox of the optical see-through AR system. In some implementations, the light of the projected images may be coupled into or out of the waveguide using diffractive optical elements, such as volume holographic gratings and/or surface-relief gratings. Light from the surrounding environment may pass through a see-through region of the waveguide and reach the user's eyes as well.

SUMMARY

This disclosure relates generally to chromatic correction for optical systems. More specifically, disclosed herein are techniques for reducing or correcting chromatic aberrations of light-weight, substantially flat optical elements (e.g., a polarization volume grating, another diffraction optical element, a geometric phase device, or another optical element having a uniform thickness) used in, for example, imaging systems, near-eye display systems (e.g., AR/VR systems), and optical sensing systems. Various inventive embodiments are described herein, including devices, systems, materials, methods, processes, and the like.

According to some embodiments, an optical device may include an optical component having a uniform thickness and configured to modify a wavefront of a light beam that includes light in two or more wavelengths visible to human eyes, where the optical component has a chromatic aberration between the two or more wavelengths. The optical device may also include a metasurface on the optical component. The metasurface includes a plurality of nanostructures configured to modify respective phases of incident light at a plurality of regions of the metasurface, where the plurality of nanostructures is configured to, at each region of the plurality of regions, add a respective phase delay for each of the two or more wavelengths to correct the chromatic aberration between the two or more wavelengths.

In some embodiments of the optical device, the optical component may include a reflective polarization volume hologram, a transmissive polarization volume hologram, a geometric phase device, a transmissive polarization-insensitive diffractive optical element, a reflective polarization-insensitive diffractive optical element, or any combination thereof. The optical component may have an optical efficiency greater than 50%, greater than about 60%, greater than about 75%, greater than about 80%, greater than about 90%, greater than about 95%, or greater than about 99%, for circularly polarized light in the two or more wavelengths. The plurality of nanostructures may include, for example, a semiconductor material, a dielectric material characterized by a refractive index greater than 2.0, or a metal material. In some embodiments, two or more nanostructures in the plurality of nanostructures may have at least one of different respective lateral areas, different respective lateral shapes, or different respective orientations.

In some embodiments, the optical component may include a first substrate, a second substrate, and a layer of a birefringent material between the first substrate and the second substrate, where the layer of the birefringent material may include helical structures formed by birefringent material molecules of the birefringent material. In some embodiments, at least one of the first substrate or the second substrate may include an alignment pattern formed thereon, and the birefringent material molecules may be oriented according to the alignment pattern. In some embodiments, the metasurface may be formed on a surface of at least one of the first substrate or the second substrate.

According to some embodiments, an optical device may include a polarization volume hologram including a layer of a birefringent material and configured to diffract polarized light in two or more wavelengths. The optical device may also include a metasurface on the polarization volume hologram, where the metasurface includes a plurality of nanostructures configured to modify respective phases of incident light at a plurality of regions of the metasurface. The plurality of nanostructures of the metasurface is configured to, at each region of the plurality of regions, add a respective phase delay for each of the two or more wavelengths to correct a chromatic aberration of the polarization volume hologram at the two or more wavelengths.

In some embodiments of the optical device, the polarization volume hologram may include a first substrate, a second substrate, and the layer of the birefringent material between the first substrate and the second substrate, where the layer of the birefringent material may include helical structures formed by birefringent material molecules of the birefringent material. The metasurface may be formed on a surface of at least one of the first substrate or the second substrate. In some embodiments, at least one of the first substrate or the second substrate includes an alignment pattern formed thereon, and the birefringent material molecules are oriented according to the alignment pattern to form the helical structures.

In some embodiments, the birefringent material may include liquid crystal molecules and a chiral dopant. The polarization volume hologram may be configured to diffract only right-handed or left-handed circularly polarized light. In some embodiments, nanostructures in the plurality of nanostructures may have a same height, and two or more nanostructures in the plurality of nanostructures may have at least one of different respective lateral areas, different respective lateral shapes, or different respective orientations. In some embodiments, the polarization volume hologram may include a reflective polarization volume hologram or a transmissive polarization volume hologram. In some embodiments, the optical device may have a phase profile of a lens, a lens array, an off-axis lens, a prism, a grating, a freeform optical component, or a combination thereof.

According to some embodiments, a method of fabricating an achromatic optical device may include forming, on a substrate, a metasurface including a plurality of nanostructures configured to modify respective phases of incident light at a plurality of regions of the metasurface; forming an alignment layer on a surface of the substrate opposing the metasurface, where orientations of patterns in the alignment layer may vary across the alignment layer; depositing, on the alignment layer, a layer of a birefringent material that includes optically anisotropic molecules and a curable stabilizing material, where the optically anisotropic molecules may align with patterns in the alignment layer to form helical structures; and curing the layer of the birefringent material to fix the curable stabilizing material and stabilize the helical structures in the layer of the birefringent material.

In some embodiments of the method, forming the metasurface on the substrate may include forming a patterned deposition mask on the substrate, depositing a layer of a high refractive index material on the substrate through the patterned deposition mask, and removing the patterned deposition mask from the substrate. In some embodiments, forming the alignment layer on the surface of the substrate opposing the metasurface may include depositing a photoalignment material layer on the surface of the substrate, and exposing the photoalignment material layer to an interference pattern generated by two overlapping circularly polarized light beams.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A illustrates an example of chromatic correction using two optical components having opposite dispersion.

FIG. 8B illustrates an example of chromatic correction using a pair of gratings.

FIG. 9A illustrates an example of an achromatic metasurface for light deflection.

FIG. 9B illustrates phase delays of the achromatic metasurface for light of different wavelengths.

FIG. 9C illustrates an example of a nanostructure of the achromatic metasurface.

FIG. 11A illustrates an example of a planar polarization volume hologram.

FIG. 11B illustrates an example of a slanted polarization volume hologram.

FIG. 11C illustrates an example of a surface alignment pattern in an alignment layer of a polarization volume hologram.

FIG. 12A illustrates an example of light dispersion by a polarization volume hologram.

FIG. 13A illustrates an example of a primary transmissive polarization volume hologram.

FIG. 13B illustrates an example of a twisted transmissive polarization volume hologram.

FIG. 13C illustrates an example of a slanted transmissive polarization volume hologram.

FIG. 13D illustrates an example of a pseudo transmissive polarization volume hologram.

FIGS. 18A-18C illustrate an example of a method of fabricating a metasurface according to certain embodiments.

FIGS. 18D-18F illustrate another example of a method of fabricating a metasurface according to certain embodiments.

FIGS. 19A-19C illustrate an example of a method of forming a polarization volume hologram on the substrate of a metasurface to form an achromatic optical device according to certain embodiments.

Figure 1:
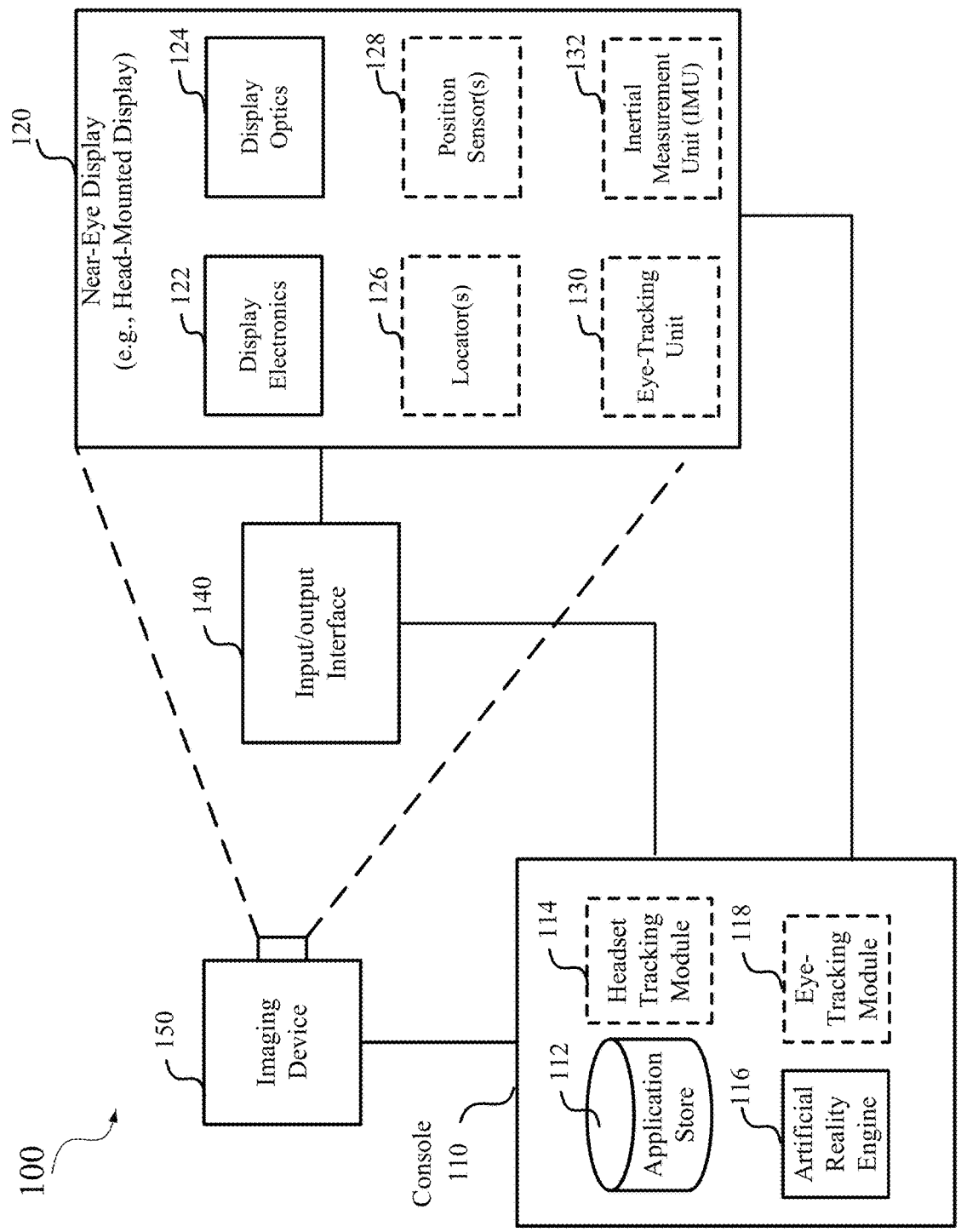
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to chromatic correction for optical systems. More specifically, disclosed herein are techniques for reducing or correcting chromatic aberrations of light-weight, substantially flat optical elements (e.g., a polarization volume grating, another diffraction optical element, a geometric phase device, or another optical element having a uniform thickness) used in, for example, imaging systems, near-eye display systems (e.g., AR/VR systems), and optical sensing systems. Various inventive embodiments are described herein, including devices, systems, materials, methods, processes, and the like.

In a near-eye display system, display light of images may be projected to user's eyes by projection optics. For example, in some near-eye display systems (e.g., some virtual reality systems), the display light may be collimated and projected to user's eye by a lens system such that objects in the displayed image may appear far away from the user. In some near-eye display systems, display light may be collimated and coupled into a waveguide (e.g., a substrate), propagate within the waveguide, and be coupled out of the waveguide at multiple locations to replicate exit pupils and expand the eyebox. Two or more gratings may be used to expand the eyebox in two dimensions. In waveguide-based near-eye display systems for augmented reality applications, light from the surrounding environment may pass through at least a see-through region of the waveguide display (e.g., the substrate) and reach the user's eyes. In some implementations of the waveguide-based near-eye display systems, light of the projected images may be coupled into or out of the waveguide using diffractive optical elements, such as gratings, which may also allow light from the surrounding environment to pass through.

To reduce the size and weight of a near-eye display system, flat optical devices that are substantially flat (or may be curved but have a uniform thickness), rather than bulky refractive optical devices that utilize different thicknesses in different areas to modify the wavefront of the incident light beam, may be used. Some examples of the flat optical devices may include gratings (e.g., volume holographic Bragg gratings, surface-relief gratings, and polarization-dependent volume gratings/holograms), lenses (e.g., diffractive lenses, geometric phase lenses, meta-structure lenses), and the like. Some flat optical devices may be made to have an arbitrary phase shift profile that may be difficult to achieve using refractive optical devices. However, some of these flat optical devices that modify incident light based on the electromagnetic wave nature of light may have lower efficiencies and larger wavelength-dependency than corresponding refractive optical devices, which may have some small dispersion due to different refractive indices of the refractive material for light of different colors.

For example, projection optics or couplers implemented using some diffractive optical elements or metasurfaces may have limited coupling efficiencies due to, for example, multiple diffraction orders, less than 100% diffraction efficiency to the desired diffraction order, leakage, crosstalk, polarization dependence, angular dependence, wavelength dependence, and the like. Some diffractive optical elements, such as volume Bragg gratings (VBGs), polarization volume holograms (PVHs, also referred to as polarization volume gratings (PVGs) or Bragg polarization gratings (BPGs)), or other gratings operating in the Bragg regime, may diffract incident light (polarized or unpolarized) at a high efficiency to a first diffraction order and thus may be able to achieve high diffraction efficiencies (e.g., >90% or >99%) for light in a certain wavelength range and from a certain field-of-view range. For example, for a circularly polarized input light beam, the efficiency of a PVH can reach about 100% for a small wavelength/angular range, and about 90% or higher for a wide field of view. However, these optical devices based on diffraction or constructive/destructive interference principles may have a strong dependency on the wavelength of the incident light. The wavelength dependency of these optical devices may cause chromatic aberrations, where, for example, images of different colors may not overlap, and/or images of some colors may be out of focus on an image plane, and thus may have large chromatic aberration in the displayed images.

According to certain embodiments, to achieve a large diffraction angle, a high diffraction efficiency, and an achromatic performance, an achromatic optical device (e.g., a flat beam deflector, lens, etc.) may include a PVH (or another substantially flat optical component, such as a holographic optical element or a geometric phase device) and a metasurface, where the metasurface may be used to correct the chromatic aberration of the PVH. In one example, the target phase of an achromatic device as a function of the location (e.g., the coordinates) on the achromatic device may be determined for multiple wavelengths, and the phase of a PVH as a function of the location may also be determined for the multiple wavelengths and may be subtracted from the target phase of the achromatic device to determine the desired phase delay of the metasurface as a function of the location for the multiple wavelengths. The metasurface itself may not be achromatic and may be designed as described above and below to achieve the desired phase delay. The metasurface may have a high packing density and thus may be able to achieve a high efficiency because the metasurface does not need to be achromatic and a large portion of the phase of the achromatic device may be contributed by the PVH. As such, the PVH and the metasurface, in combination, may achieve the desired high diffraction efficiency, large diffraction angle, and low chromatic aberration.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
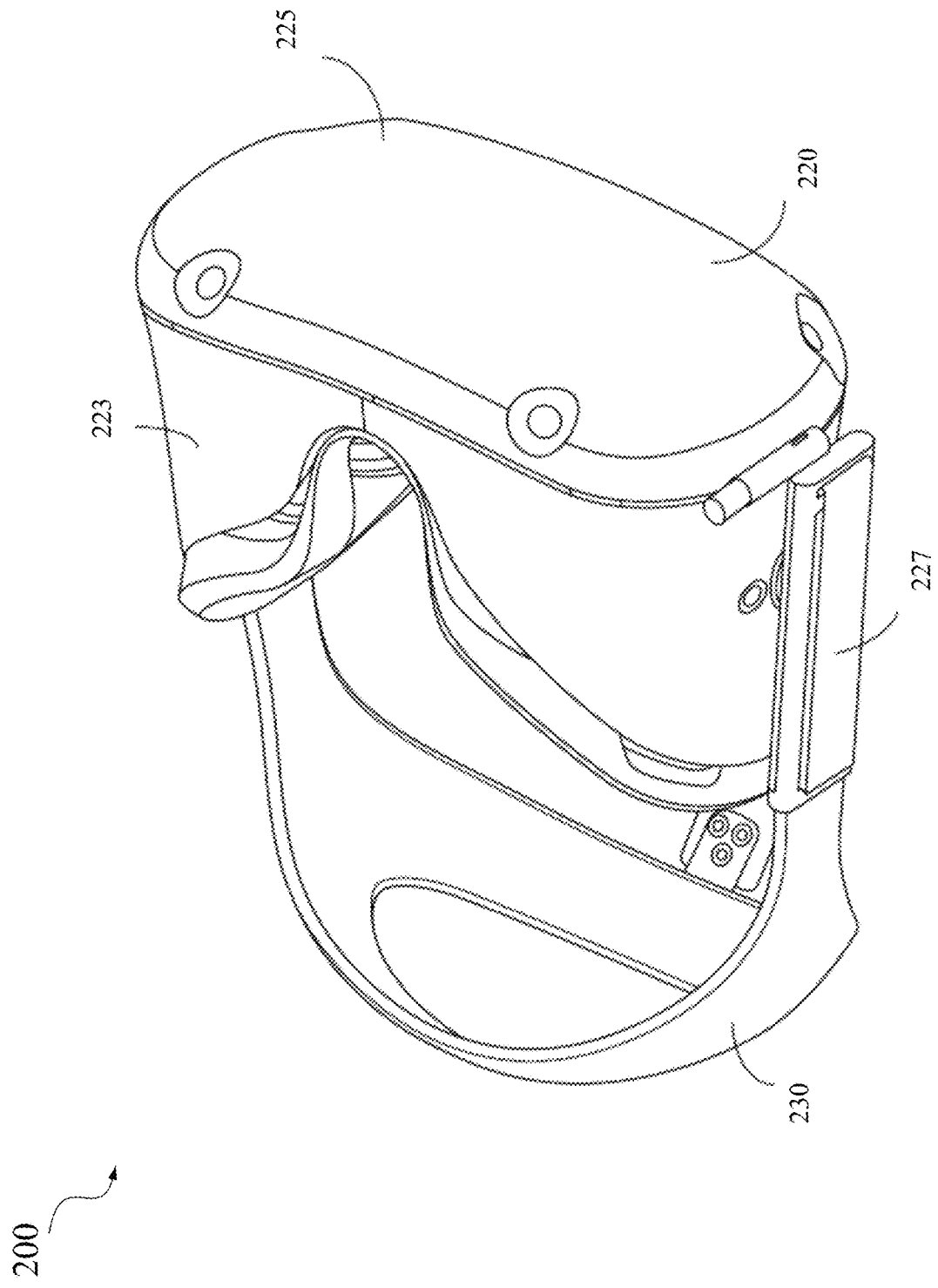
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
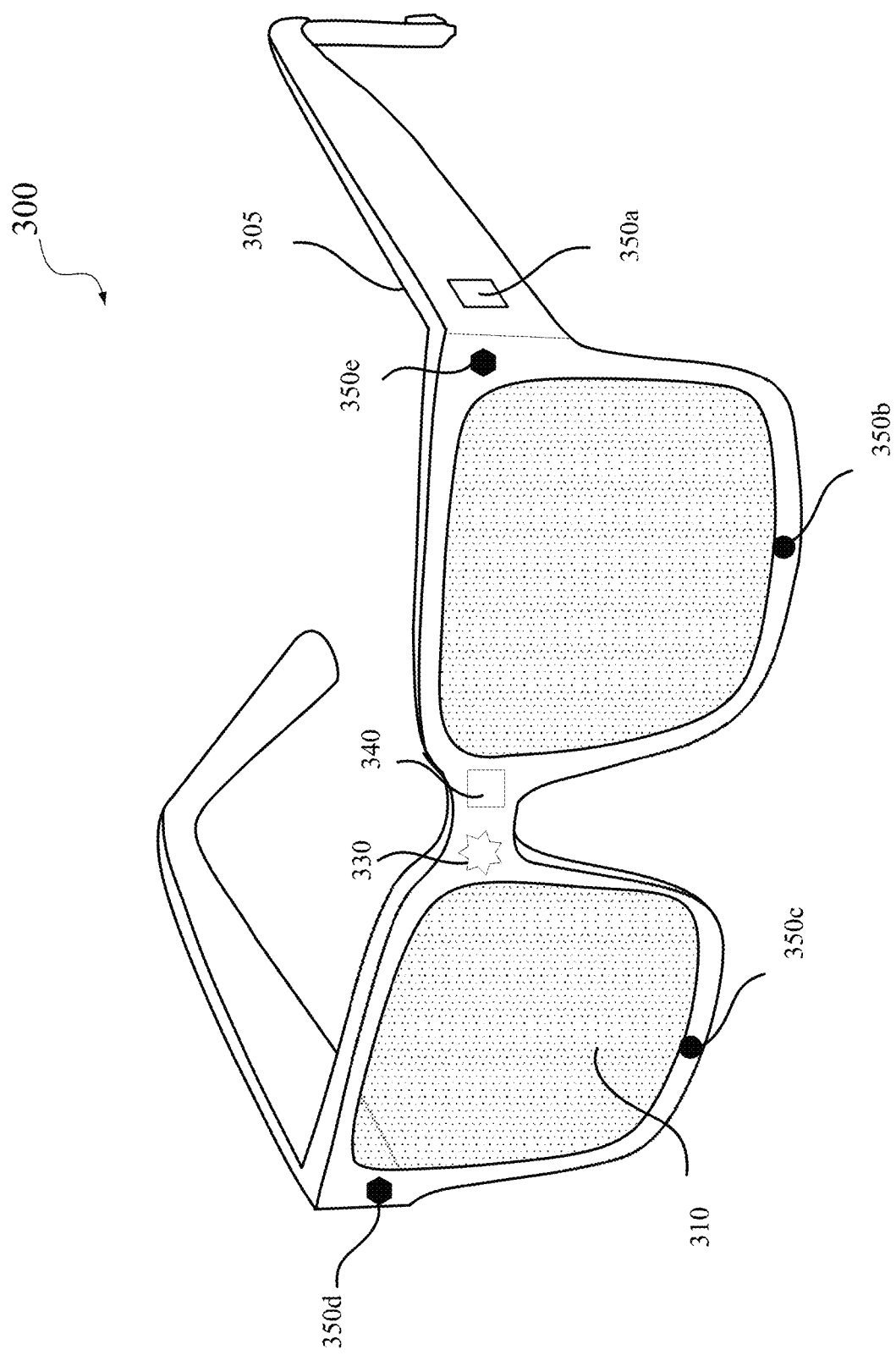
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
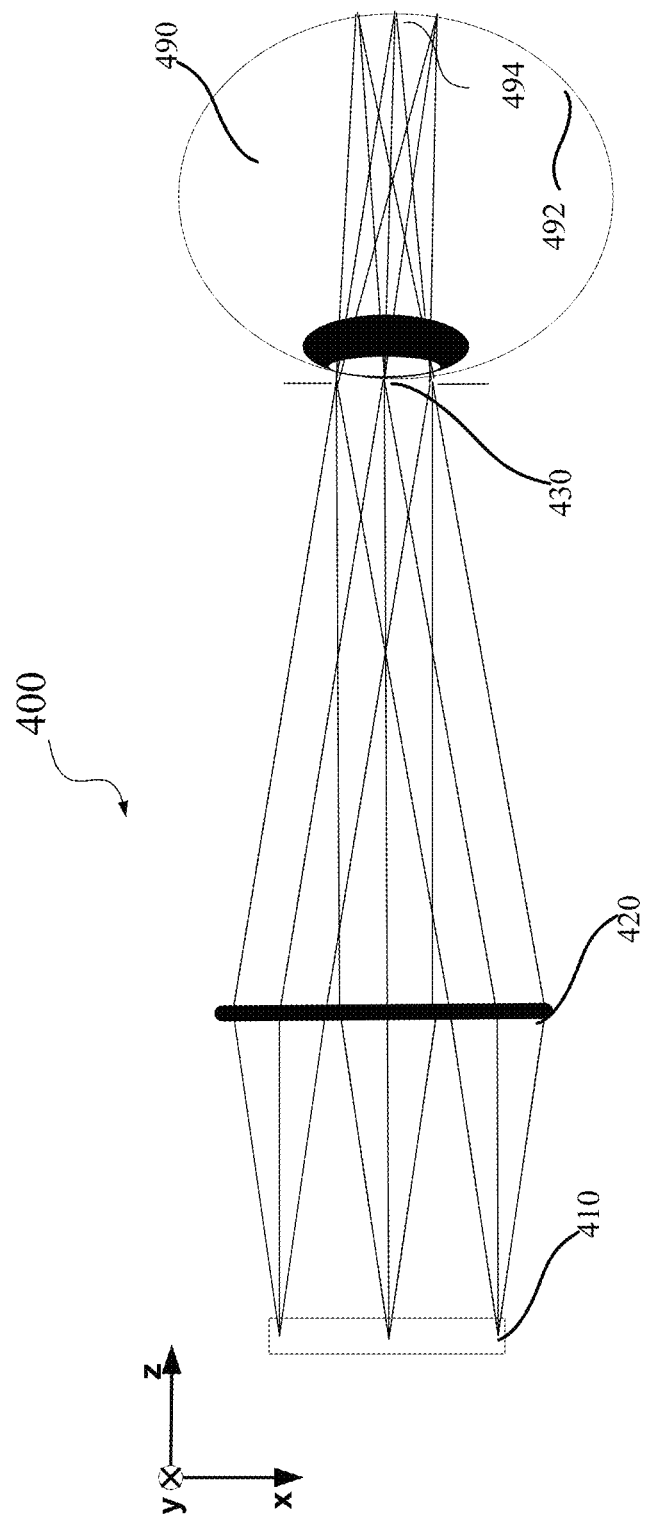
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

The user experience of using an artificial reality system may depend on several characteristics of the optical system, including field of view (FOV), image quality (e.g., angular resolution), size of the eyebox (to accommodate for eye and head movements), and brightness of the light (or contrast within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arc-minutes, compared with the one-arc-minute resolution associated with Snellen 20/20 human visual acuity. Optical aberrations of the optical system, such as defocus aberrations, spherical aberrations, coma, and chromatic aberrations, may reduce the resolution of the images perceived by user's eyes.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In addition, to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
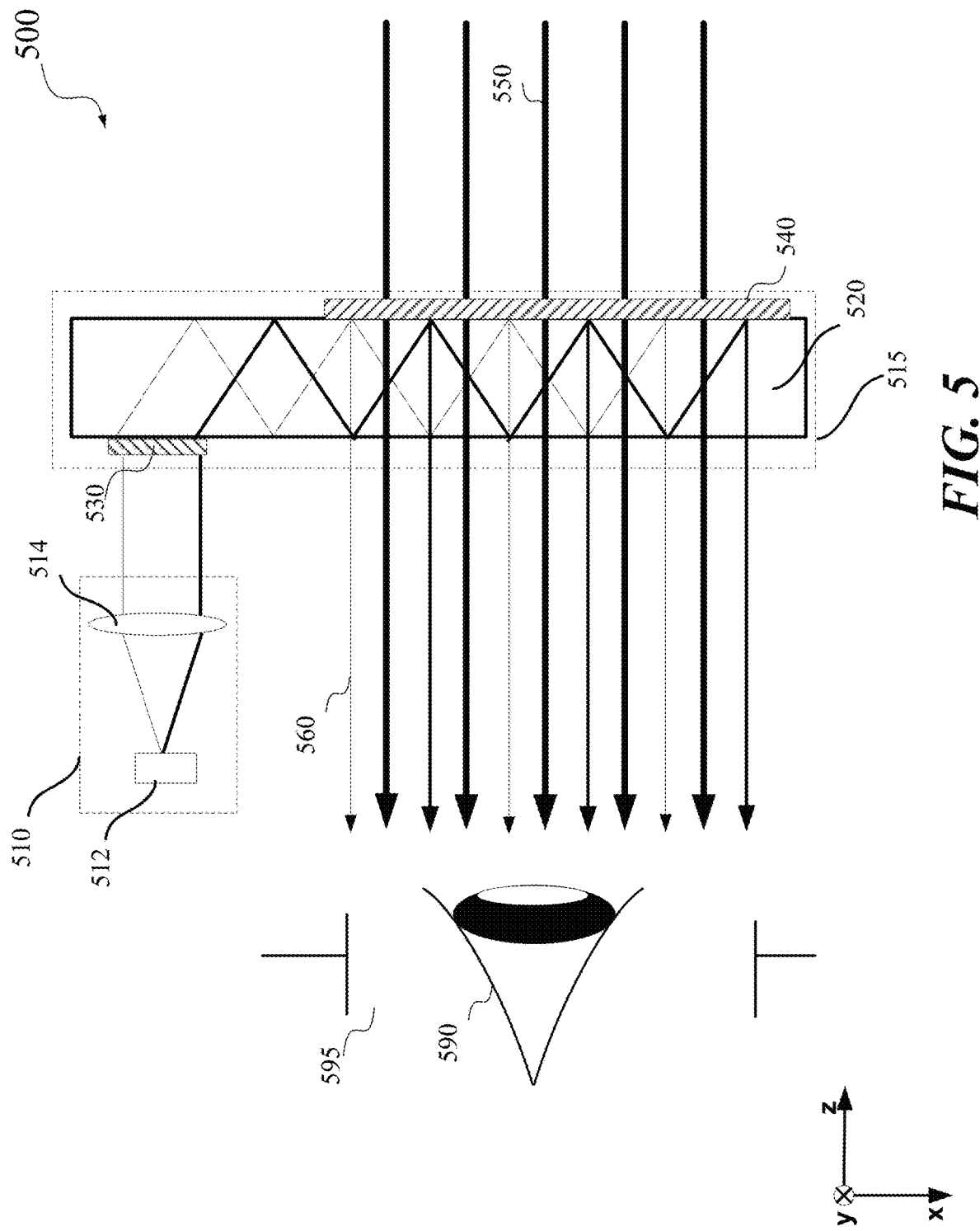
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (sLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). For example, input coupler 530 may include a reflective volume Bragg grating or a transmissive volume Bragg grating. Input coupler 530 may have a coupling efficiency of greater than 30%, 50%, 75%, 90%, or higher for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. For example, output couplers 540 may include reflective volume Bragg gratings or transmissive volume Bragg gratings. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffraction angles) with little loss. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflective gratings (also referred to as reflective gratings) or transmissive gratings (also referred to as transmissive gratings) to couple display light into or out of substrate 520.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers can be implemented using volume holographic gratings or surface-relief gratings, which may have very different Klein-Cook parameter Q:

$$Q = \frac{2\pi\lambda d}{n\Lambda^2},$$

where d is the thickness of the grating, λ is the wavelength of the incident light in free space, Λ is the grating period, and n is the refractive index of the recording medium. The Klein-Cook parameter Q may divide light diffraction by gratings into three regimes. When a grating is characterized by Q≪1, light diffraction by the grating may be referred to as Raman-Nath diffraction, where multiple diffraction orders may occur for normal and/or oblique incident light. When a grating is characterized by Q≫1 (e.g., Q>10), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., Δn≤0.05) and high spectral and angular selectivity, while surface-relief gratings may generally have large refractive index modulations (e.g., Δn≥0.2 or higher) and wide spectral and angular bandwidths.

Figure 6A:
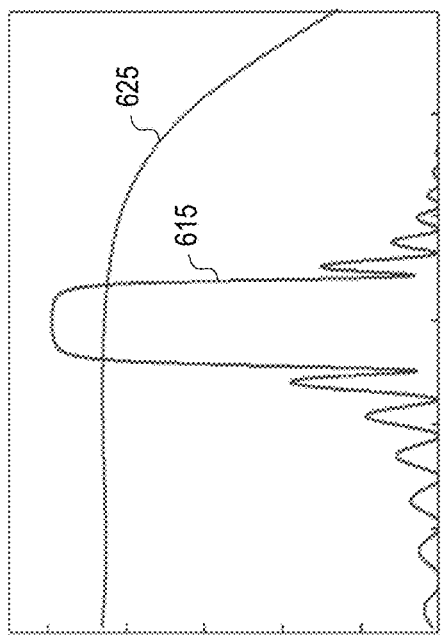
FIG. 6A illustrates the spectral bandwidth of an example of a reflective volume Bragg grating (VBG) and the spectral bandwidth of an example of a surface-relief grating (SRG).

FIG. 6A illustrates the spectral bandwidth of an example of a volume Bragg grating (e.g., a reflective VBG) and the spectral bandwidth of an example of a surface-relief grating (e.g., a transmissive SRG). The horizontal axis in FIG. 6A represents the wavelength of the incident visible light and the vertical axis corresponds to the diffraction efficiency. As shown by a curve 610, the diffraction efficiency of the reflective VBG is high in a narrow wavelength range, such as some green light. In contrast, the diffraction efficiency of the transmissive SRG may be high in a wide wavelength range, such as from blue to red light, as shown by a curve 620.

Figure 6B:
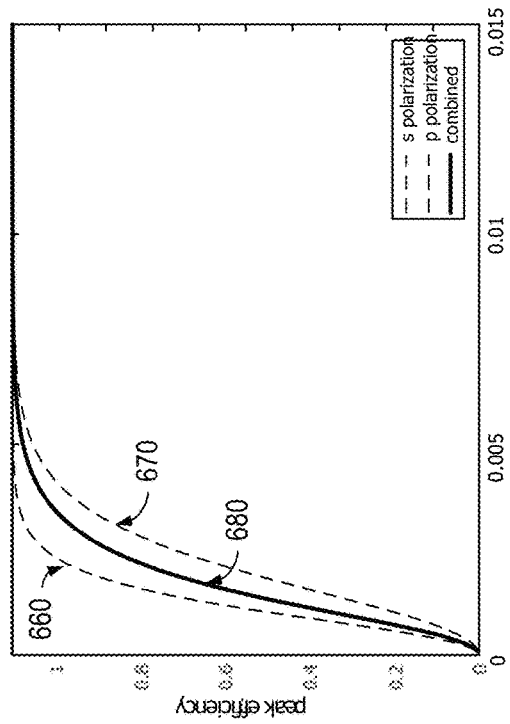
FIG. 6B illustrates the angular bandwidth of an example of a reflective VBG and the angular bandwidth of an example of an SRG.

FIG. 6B illustrates the angular bandwidth of an example of a volume Bragg grating (e.g., a reflective VBG) and the angular bandwidth of an example of a surface-relief grating (e.g., a transmissive SRG). The horizontal axis in FIG. 6B represents the incident angle of the visible light incident on the grating, and the vertical axis corresponds to the diffraction efficiency. As shown by a curve 615, the diffraction efficiency of the reflective VBG is high for light incident on the grating from a narrow angular range, such as about ±2.5° from the perfect Bragg condition. In contrast, the diffraction efficiency of the transmissive SRG is high in a wide angular range, such as greater than about ±10° or wider, as shown by a curve 625.

VBGs may be reflective VBGs or transmissive VBGs. Reflective VBGs and transmissive VBGs can have different diffraction properties. For example, reflective VBGs may have relatively lower dispersion than transmissive VBGs of similar thicknesses. Transmissive VBGs used as output gratings may allow for the overlapping of the gratings for two-dimensional pupil replication to reduce the physical size of the waveguide display, while reflective VBGs may not. Reflective VBGs and transmissive VBGs may also have different performance in the diffraction efficiency and spectral/angular bandwidth.

Figure 6C:
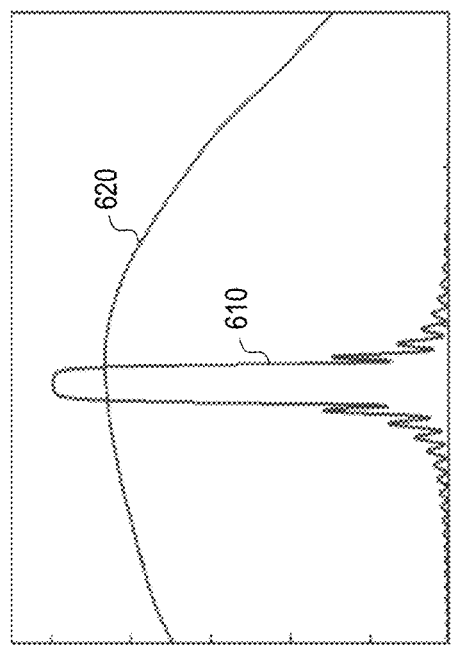
FIG. 6C illustrates diffraction efficiencies of examples of transmissive volume Bragg gratings having the same thickness but different refractive index modulations.

FIG. 6C illustrates the diffraction efficiencies of examples of transmissive volume Bragg gratings having the same thickness but different refractive index modulations. The diffraction efficiencies may be polarization-dependent. A curve 630 in FIG. 6C shows the diffraction efficiencies of the examples of transmissive VBGs for s-polarized light, while a curve 640 shows the diffraction efficiencies of the examples of transmissive VBGs for p-polarized light. A curve 650 shows the average diffraction efficiencies of the examples of transmissive VBGs for s- and p-polarized light (e.g., unpolarized light). As shown in FIG. 6C, curve 630 and curve 640 may correspond to functions that are proportional to a square of a sinusoidal function (e.g., $\propto \sin^2(a \times n \times D)$). The diffraction efficiencies of transmissive VBGs may increase or decrease with the increase of the refractive index modulation. Thus, increasing the refractive index modulation of a transmissive VBG may not necessarily increase the diffraction efficiency of the transmissive VBG.

Figure 6D:
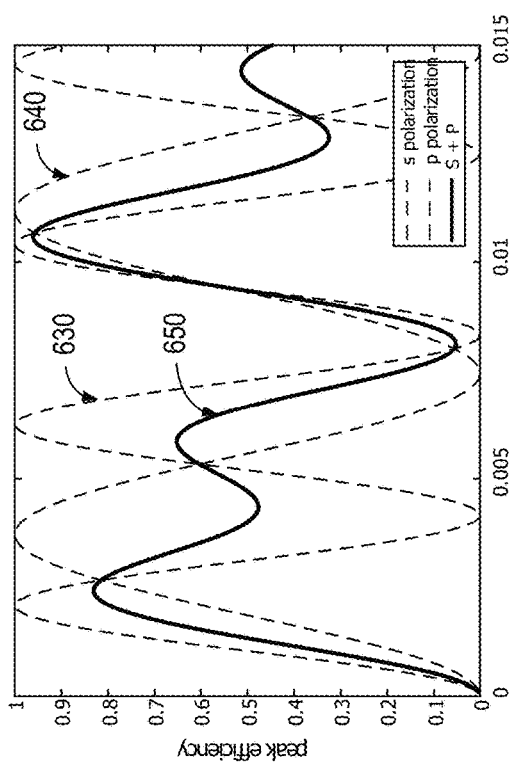
FIG. 6D illustrates diffraction efficiencies of examples of reflective volume Bragg gratings having the same thickness but different refractive index modulations.

FIG. 6D illustrates the diffraction efficiencies of examples of reflective volume Bragg gratings having the same thickness but different refractive index modulations. The diffraction efficiencies for reflective VBGs may also be polarization-dependent for low refractive index modulation. A curve 660 shows the diffraction efficiencies of the examples of reflective VBGs for s-polarized light, while a curve 670 shows the diffraction efficiencies of the examples of reflective VBGs for p-polarized light. A curve 680 shows the average diffraction efficiencies of the examples of reflective VBGs for s- and p-polarized light (e.g., unpolarized light). As shown in FIG. 6D, the diffraction efficiencies of reflective VBGs may increase with the increase of the refractive index modulation (e.g., $\propto \tan h^2(a \times n \times D)$) and may saturate when the refractive index modulation reaches a certain value. The full-width-half-magnitude (FWHM) angular range and the FWHM wavelength range of reflective VBGs may be broadened as the refractive index modulation continues to increase.

The above-described refractive and diffractive optical elements (e.g., lenses and gratings) used in near-eye display systems may have very different responses to broadband light because two different physics principles are used by the optical elements to shape the light. Refractive optics may gradually modify the phase of the wavefront of the lightwave through gradual phase accumulation during propagation in the refractive material, while diffractive optical elements may modify the wavefront of the lightwave due to the interference of wavelets passing through different portions of the diffractive optical elements that may have different phase shifts. Most transparent materials in the visible band may have a refractive index $n(\lambda)$ that may decrease with increasing wavelength (referred to as "normal dispersion"), and thus refractive lenses made of materials with normal dispersion may have longer focal lengths for red light than for blue light, and prisms made of materials with normal dispersion may deflect light having longer wavelengths by smaller angles. In contrast, diffractive lenses and gratings may have the opposite dispersion characteristics, and may have a shorter focal lengths or larger deflection angle for red light than for blue light.

Figure 7A:
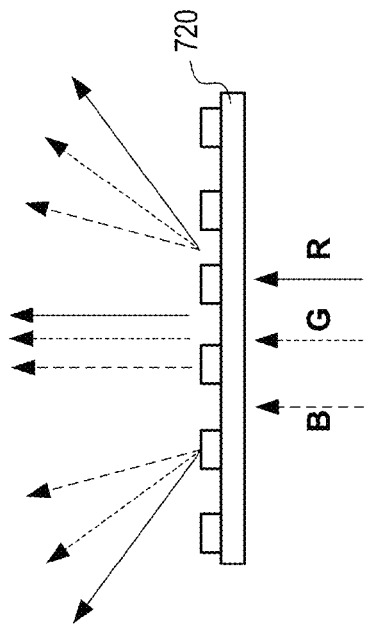
FIG. 7A illustrates an example of light dispersion by a refractive light deflection optical component (e.g., a prism).

FIG. 7A illustrates an example of light dispersion by a refractive light deflection optical component (e.g., a prism 710). In the illustrated example, prism 700 may include a material (e.g., glass) that has normal dispersion. Thus, the refractive index of prism 700 for red light (having a longer wavelength) may be smaller than the refractive index for blue light. As such, for surface-normal incident light, the refraction angle of the light refracted out of prism 710 at the glass/air interface may be smaller for red light than for blue light. Therefore, surface-normal incident light of different colors may be refracted out of prism 710 at different angles, which may be useful for some applications (e.g., wavelength division demultiplexing) but may cause chromatic aberrations that may reduce image quality.

Figure 7B:
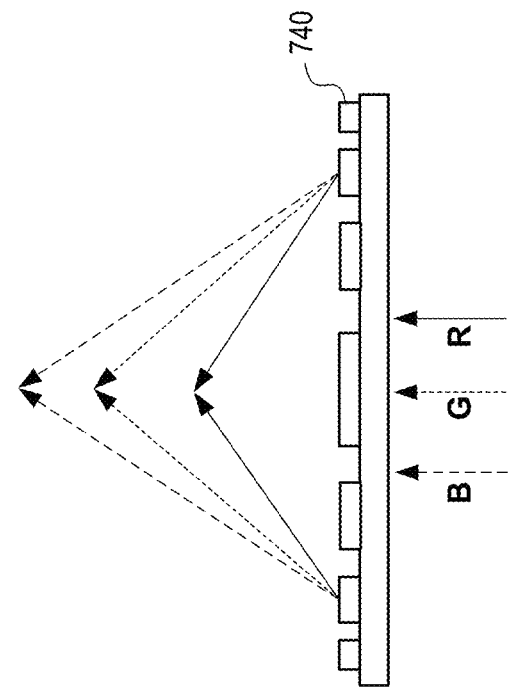
FIG. 7B illustrates an example of light dispersion by a diffractive light deflection optical component (e.g., a grating).

FIG. 7B illustrates an example of light dispersion by a diffractive light deflection optical component (e.g., a grating 720). In grating 720, for surface-normal incident light, the diffraction angle for non-zero diffraction orders may be larger for red light than for blue light in order to satisfy the grating equation, such as $d \times \sin \theta = m \times \lambda$ for binary gratings, where d is the grating period, $\theta$ is the diffraction angle, m is the diffraction order, and $\lambda$ is the wavelength. Therefore, surface-normal incident light of different colors may be diffracted by grating 720 at different angles, which may be useful for some applications but may cause chromatic aberrations that may reduce the image quality. FIGS. 7A and 7B show that refractive light deflection optical components (e.g., prism 710) and diffractive light deflection optical components (e.g., grating 720) may have opposite dispersion characteristics.

Figure 7C:
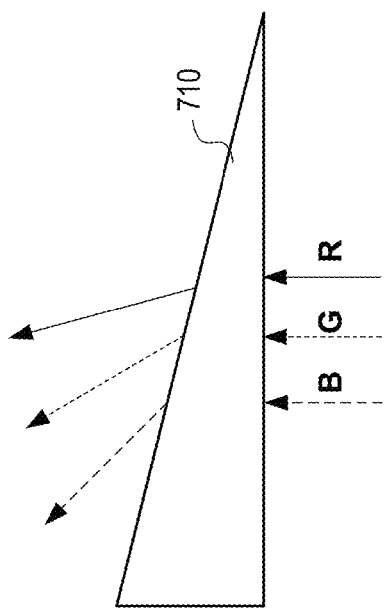
FIG. 7C illustrates an example of light dispersion by a refractive light focusing optical component (e.g., a lens).

FIG. 7C illustrates an example of light dispersion by a refractive light focusing optical component (e.g., a lens 730). Lens 730 may include a material (e.g., glass) that has normal dispersion. Thus, the refractive index of lens 730 for red light may be smaller than the refractive index for blue light. Therefore, as prism 710 in FIG. 7A, lens 730 may bend blue light at a larger angle than red light, such that blue light may focus at a shorter distance than red light. As such, light of different colors may have the best focus at different image planes, which may cause chromatic aberrations that may reduce the image quality.

Figure 7D:
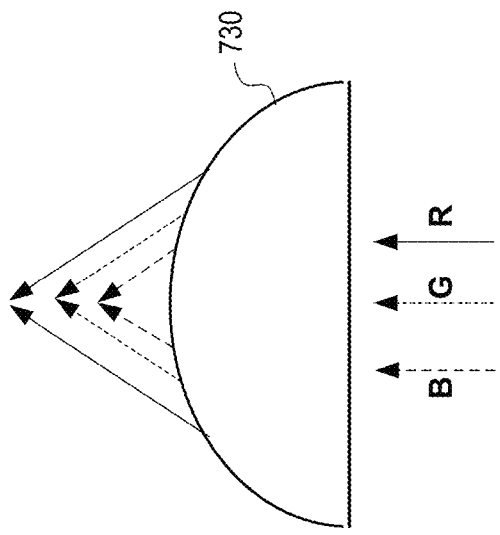
FIG. 7D illustrates an example of light dispersion by a diffractive light focusing optical component (e.g., a diffractive lens).

FIG. 7D illustrates an example of light dispersion by a diffractive light focusing optical component (e.g., a diffractive lens 740). As described above with respect to FIG. 7B, red light may have a larger diffraction angle than blue light, and thus may be focused by diffractive lens 740 at a shorter distance than blue light as illustrated in FIG. 7D. Therefore, light of different colors may have the best focus at different image planes, which may cause chromatic aberrations that may reduce the image quality. FIGS. 7C and 7D show that refractive light focusing optical components (e.g., lens 730) and diffractive light deflection optical components (e.g., diffractive lens 740) may have opposite dispersion characteristics.

There may be several methods to correct the overall chromatic aberrations of an optical system. In a digital compensation method, the chromatic aberration of a display system may be reduced by preprocessing images according to the chromatic dispersion of the optics, at the cost of extra graphic computation power. The digital chromatic correction may help to decrease but may not completely eliminate chromatic aberrations because each color channel may have a certain contiguous spectral bandwidth. Conventional optical chromatic correction techniques may utilize two or more refractive optical elements (e.g., lenses or prisms) made of materials with different refractive index dispersion characteristics (or Abbe numbers) in a same system to compensate the chromatic aberrations, which may increase the size, weight, and cost of the system. Chromatic aberrations may also be reduced using a diffractive optical element (which may have a negative Abbe number) and a refractive optical element.

FIG. 8A illustrates an example of chromatic correction using two optical components having opposite dispersion in a near-eye display system 800. In the illustrated example, near-eye display system 800 may include an image source 810 (e.g., an LED or LCD display panel), a polarizer 820 (e.g., a quarter waveplate or a circular polarizer), a Pancharatnam-Berry phase (PBP) lens 830 (also referred to as a geometric phase lens), a circular polarizer 840, and a refractive lens 850. Polarizer 820 may be used to generate a circularly polarized light beam (e.g., a right-handed circular polarization (RHCP) beam) from, for example, a linear polarization light. PBP 830 may have a flat physical geometry with a uniform thickness of only several microns, and may be polarization sensitive. For example, PBP lens 830 may only diffract RHCP light, and may allow left-handed circular polarization (LHCP) light to pass through without being diffracted. Stray light from diffraction leakage (e.g., the undiffracted zero-order LHCP light) may be eliminated or blocked by circular polarizer 840. PBL 830 may be made of liquid crystal (LC) polymers that have opposite chromatic aberration compared with refractive lens 850. Thus, the overall chromatic aberrations of near-eye display system 800 may be effectively reduced.

FIG. 8B illustrates an example of chromatic correction using a pair of gratings (e.g., grating lenses). In the illustrated example, the system may include a first grating lens 860 and a second grating lens 870. Incident light of different wavelengths may be diffracted by first grating lens 860 to different directions due to the dispersion of first grating lens 860. For example, the diffraction angle may be smaller for light in a first wavelength as shown by a light ray 880, and the diffraction angle may be larger for light in a second wavelength as shown by a light ray 882. The diffracted light may propagate towards second grating lens 870, which may diffract the incident light again. Second grating lens 870 may also have a smaller diffraction angle for light in the first wavelength and a large diffraction angle for light in the second wavelength. However, due to the arrangement of the two grating lenses, light diffracted by the bottom portion of first grating lens 860 may be diffracted by the top portion of second grating lens 870, and thus light of different wavelengths may converge to the same focal point as shown in FIG. 8B. Thus, the chromatic aberrations caused by the two grating lenses may be canceled out to reduce the overall chromatic aberration of the system.

Systems shown in FIGS. 8A and 8B may have lower chromatic aberrations, but may have large form factors, higher weights, and higher costs, and thus may not be suitable for near-eye displays. In some embodiments, substantially flat metasurfaces, which may be planar or curved but have a uniform thickness, may be used to achieve achromatic performance. Metasurfaces may include a dense arrangement of subwavelength nanostructures that may resonate to modify the amplitude and/or phase of the wavefront of the incident light by desired values. The modification of the wavefront may be tuned by tuning the material (e.g., dielectric, semiconductor, or metallic), size (e.g., diameter or side), geometry (e.g., cylinder or rectangular prism), orientation, and environment of the nanostructures and thus the resonant condition of the nanostructures to achieve various flat optical devices, such as blazed gratings, lenses, polarizers, and wave plates. Metasurfaces can provide continuous control of the phase profile (e.g., from 0 to $2\pi$) using two thickness (or height) levels, and can reduce high diffraction orders while maintaining the advantages of small size, low weight, and ease of fabrication of planar diffractive optics. Many metasurface-based optical devices may also have large chromatic aberrations, but metasurfaces can be designed to achieve achromatic behavior at multiple wavelengths (e.g., at the cost of a lower efficiency).

A desired function (e.g., focusing or beam steering/deflecting) of a metasurface may be achieved by constructive interference between multiple wavelets from multiple light paths, where the total phase delay $\varphi_{tot}$ of each wavelet at the point (or plane) of interest may be the sum of a phase shift $\varphi_m(x, \lambda)$ introduced by the metasurface at a corresponding point x of the metasurface and a phase $\varphi_p(x, \lambda)$ accumulated during propagation from the point x of the metasurface to the point (or plane) of interest, such as a focal point or a plane perpendicular to a certain direction. To achieve achromatic behavior (e.g., a deflection angle or focal length independent of wavelength), the condition (e.g., focal point or deflection direction) for constructive interference needs to be preserved for different wavelengths.

In some embodiments, to design a metasurface for a certain function, Fourier optics may be used to determine the desired phase profile that can produce a desired field distribution in the far field. For example, for a blazed grating, a simple phase profile with a linear dependence on the position may be needed, where the phase profile may increase or decrease by $2\pi$ across one grating period. The desired phase profile may then be discretized into segments that may have discrete phases. Each discrete phase for a corresponding segment of the discretized phase profile may be achieved using a corresponding nanostructure or nanostructures by tuning the parameters of the nanostructures, such as the size, shape (or geometry), material, orientation, and the like as described above and below.

FIG. 9A illustrates an example of an achromatic metasurface 900 for light deflection. Achromatic metasurface 900 may include a substrate 910 (including, e.g., glass, quartz, plastic, crystal, ceramic, or the like) and nanostructures 920 (e.g., dielectric, semiconductor, or metal nanostructures) formed on substrate 910. FIG. 9A shows that the desired wavefronts for light of multiple colors may all be plane waves tilted at an angle $\theta$ with respect to achromatic metasurface 900, such that the propagation directions of the incident light of different color are all deflected by achromatic metasurface 900 by an angle $\theta$.

FIG. 9B illustrates phase shifts of achromatic metasurface 900 for light of different wavelengths in order to achieve the desired wavefronts shown in FIG. 9A. As described above, the total phase delay $\varphi_{tot}$ of each wavelet at the point (or plane) of interest may be the sum of a phase shift $\varphi_m(x, \lambda)$ introduced by achromatic metasurface 900 at a corresponding point x of achromatic metasurface 900 and a phase $\varphi_p(x, \lambda)$ accumulated during propagation from point x of achromatic metasurface 900 to the point (or plane) of interest. The phase accumulated during propagation may be $\varphi_p(x, \lambda) = 2\pi \times l/\lambda$, where l is the optical path length (e.g., distance in free space) from point x of achromatic metasurface 900 to the point (or plane) of interest. Thus, the phase shift $\varphi_m(x, \lambda)$ introduced by achromatic metasurface 900 at the corresponding point x of the metasurface may need to be $\varphi_m(x, \lambda) = -2\pi \times l/\lambda$ in order to compensate for the wavelength-dependent phase accumulated during propagation. The phase shifts at different points x of achromatic metasurface 900 for light of each different wavelength are shown by a respective line 930 in FIG. 9B, which shows that at a given point x on achromatic metasurface 900, the phase shift imparted at point x on achromatic metasurface 900 may need to be different for different wavelengths. For example, for red light, because the wavelength λ of the light is longer, phase $\varphi_p(x, \lambda)$ accumulated during propagation may be smaller, and thus phase shift $\varphi_m(x, \lambda)$ introduced by achromatic metasurface 900 may need to be smaller.

FIG. 9C illustrates an example of a nanostructure 902 of nanostructures 920 in achromatic metasurface 900. In the illustrated example, nanostructure 902 may have a width D, and may include two coupled rectangular resonators 922 of a same height t and varying widths $w_1$ and $w_2$. The gap g between the two coupled rectangular resonators may also be varied to tune the resonant conditions and the phase shifts for light of different colors at any given point on achromatic metasurface 900.

Figure 10B:
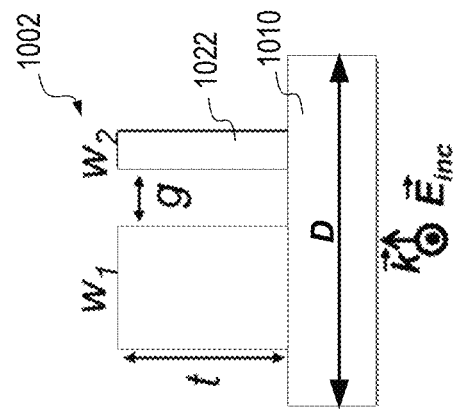
FIG. 10B illustrates an example of a nanostructure of the achromatic flat lens of FIG. 10A.
Figure 10A:
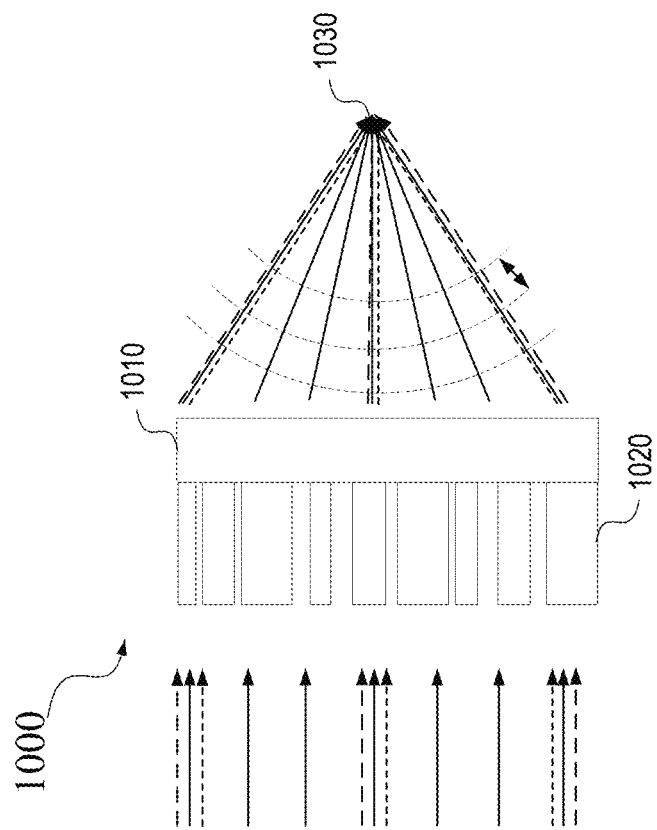
FIG. 10A illustrates an example of an achromatic flat lens including a metasurface.

FIG. 10A illustrates an example of an achromatic flat lens 1000 including a metasurface 1020 on a substrate 1010. Substrate 1010 may include a transparent material, such as glass, quartz, plastic, crystal, ceramic, or the like. Metasurface 1020 may include, for example, a high refractive index dielectric material, a semiconductor material, a metal, and the like. Metasurface 1020 may include nanostructures that are designed to modify the phase of the incident light differently at different locations such that collimated incident light having different colors may be focused onto a same spot (e.g., focal point 1030) by achromatic flat lens 1000. As described above, the total phase delay $\varphi_{tot}$ of each wavelet at the focal point may be the sum of the phase shift $\varphi_m(x, \lambda)$ introduced by metasurface 1020 at a corresponding point x of metasurface 1020 and the phase $\varphi_p(x, \lambda)$ accumulated during propagation from the point x of metasurface 1020 to focal point 1030. The target phase shift $\varphi_m(x, \lambda)$ introduced by metasurface 1020 at a point x for each wavelength λ may be described by:

$$\varphi_m(x, \lambda) = -\frac{2\pi}{\lambda}(\sqrt{x^2 + f^2} - f).$$

FIG. 10B illustrates an example of a nanostructure 1002 of metasurface 1020 in achromatic flat lens 1000. In the illustrated example, nanostructure 1002 may have a width D, and may include two coupled rectangular resonators 1022 of a same height t and varying widths $w_1$ and $w_2$. The gap g between the two coupled rectangular resonators may also be varied to tune the resonant conditions and the phase shifts for light of different colors at any given point x on achromatic flat lens 1000.

Single layer metasurfaces described above may be able to achieve the desired achromatic performance, but may have low optical efficiencies due to, for example, low fill factors in the metasurfaces. To increase the efficiency, it may be desirable to reduce the interspace between the nanostructures (e.g., resonators) and increase the packing density of the nanostructures. However, at higher packing densities and with smaller interspaces, the near field of adjacent nanostructures may start to couple and modify the amplitude and/or phase responses of individual nanostructures to deviate from the designed values.

Polarization volume holograms (PVHs, also referred to as polarization volume gratings (PVGs) or Bragg polarization gratings (BPGs)) are a type of Bragg grating (Q>1) that has strong polarization selectivity, where only light of a particular polarization state (e.g., right-handed or left-handed circular polarization light) may be diffracted by a PVH. PVHs may have higher refractive index modulation Δn (caused by the large birefringence of the material) than unpolarized VBGs (e.g., VBGs made of photopolymers), and thus may achieve high (e.g., nearly 100%) first-order diffraction efficiencies at large diffraction angles and can have wider angular/spectral bandwidth for incident light compared with VBGs. A PVH may include a birefringent material layer having a plurality of optically anisotropic (e.g., birefringent) molecules. For example, liquid crystal (LC) PVHs may include liquid crystal molecules that form a unique self-organized asymmetric helical structure following a two dimensional alignment pattern, and may only diffract incident light having the same chirality or handedness as the helical structure.

FIG. 11A illustrates an example of a planar PVH 1100. In the illustrated example, PVH 1100 may include a chiral dopant and birefringent material molecules 1120 (e.g., nematic liquid crystal molecules) that form a patterned helical structure on an alignment layer 1110. PVH 1100 may also include a second alignment layer (not shown in FIG. 11A) that may or may not have an alignment pattern, where the patterned helical structure including birefringent material molecules 1120 may be sandwiched by alignment layer 1110 and the second alignment layer. A helical structure along they direction may be achieved due to the doping of the chiral dopant into the birefringent material molecules (e.g., LC molecules), and the periodicity $P_y$ (and pitch p) along the y axis may be tuned by controlling the helical twist power (HTP) and/or the concentration of the chiral dopant. Due to the helical twisting power of chiral dopant, the optical axis of the birefringent material (e.g., LC directors) may rotate along the helix. The birefringent material layer needs to be thick enough (e.g., about a few microns) to include several pitches in the bulk in order to operate in the Bragg regime.

Alignment layer 1110 may have a periodic surface alignment pattern. Due to the periodic surface alignment pattern, the optical axis of the birefringent material at different positions on alignment layer 1110 may rotate with different azimuthal angles in the x-z (horizontal) plane and may form a periodic structure in the horizontal plane. In contrast, in a conventional cholesteric liquid crystal (CLC) structure, a helical twist may be induced along the vertical direction while the LCs may be homogeneous in the horizontal plane. Birefringent material molecules 1120 may exhibit a helical structure that may have a periodicity perpendicular to alignment layer 1110, and may have periodical slanted refractive index planes having a slant angle ϕ with respect to alignment layer 1110. Thus, the grating vector K of PVH 1100 may have a slant angle ϕ with respect to the surface normal direction of alignment layer 1110. When the number of periodic refractive index planes is sufficiently high, Bragg diffraction condition may be met and PVH 1100 may reflectively diffract incident circularly polarized light at a high efficiency to the +1st or the −1st diffraction order, depending on the handedness of the incident circularly polarized light, as shown in FIG. 11A. For example, PVH 1100 may diffract right-handed circularly polarized light to the first diffraction order at a high efficiency and may allow left-handed circularly polarized light to pass through with minimum or substantially no diffraction.

FIG. 11B illustrates an example of a slanted PVH 1105. PVH 1105 may include an alignment layer 1112 and birefringent material molecules 1122 (e.g., liquid crystal molecules) having a helical structure that is tilted with respect to alignment layer 1112, and may have periodical slanted refractive index planes having a slant angle φ with respect to alignment layer 1112. Thus, the grating vector K of PVH 1105 may have a slant angle φ with respect to the surface-normal direction of alignment layer 1112. When the number of periodic refractive index planes is sufficiently high, Bragg diffraction condition may be met and PVH 1105 may reflectively diffract incident circularly polarized light at a high efficiency to the +1st or the −1st order depending on the handedness of the incident circularly polarized light as shown in FIG. 11B. For example, PVH 1105 may diffract right-handed circularly polarized light to the first diffraction order at a high efficiency and may allow left-handed circularly polarized light to pass through with minimum or substantially no diffraction. Even though not shown in FIG. 11B, PVH 1105 may also include a second alignment layer, where the patterned helical structure including birefringent material molecules 1122 may be sandwiched by alignment layer 1112 and the second alignment layer.

FIG. 11C illustrates an example of a surface alignment pattern of an alignment layer (e.g., alignment layer 1110 or 1112) in a polarization volume hologram. As illustrated, the alignment layer may be treated to rotate LC molecules or other birefringent material molecules in the x-z plane, where the rotating angle of the birefringent material molecules may change continuously and periodically along x axis with a period $P_x$. The alignment pattern may be generated using various methods. In one example, the alignment pattern may be generated by recording an interference pattern of a left-handed circularly polarized beam and a right-handed circularly polarized beam using a photopolymer. In another example, a layer of photoalignment material (PAM) including, for example, photocurable monomers, may be formed on the surface of the alignment layer and may then be exposed to an alignment light beam (e.g., a linearly polarized light beam) with a desired intensity and incident angle, where the alignment light beam may be scanned over the layer of PAM while rotating the polarization of the alignment light beam to create a cycloidal pattern in the layer of photoalignment material. After the formation of the surface alignment pattern on the alignment layer, a layer of birefringent material molecules with a chiral dopant may be applied onto the alignment layer to form the helical structures. In some embodiments, the periodic helical structures of birefringent material molecules may be polymer-stabilized by mixing monomers of a stabilizing polymer into the birefringent material and curing the birefringent material to polymerize the monomers of the stabilizing polymer.

As described above, the cycloidal surface alignment pattern of the alignment layer may determine the orientation of the helical structures. The birefringent material molecules may exhibit helical structures with a period of $P_y$ (which may be one half of pitch p) along y-axis, where the slant angle φ of the slanted periodical refractive index planes may be φ=±arctan ($P_y/P_x$) and may be determined by the alignment pattern on the alignment layer. $P_x$ may be determined based on the incident angle, the desired diffraction angle α, the effective refractive index n of the material (e.g., n= $\sqrt{(n_e^2+2n_o^2)/3}$), and the wavelength λ of the incident light. For example, for normal incidence, Px may be determined according to $$P_x = \frac{\lambda}{n \times \sin(\alpha)}.$$

For normal incidence, the Bragg angle φ may be α/2, and the Bragg pitch $P_B$ (or Bragg period) of the PVH may be $P_B$=λ/2n cos φ, where $$\frac{1}{P_B^2} = \frac{1}{P_x^2} + \frac{1}{P_y^2}.$$

The optical properties of a PVH can be configured by configuring the helix twist and the properties of the Bragg planes in the PVH layer, including, for example, the slant angle of the Bragg planes, the Bragg pitch, the change of the slant angle and/or the Bragg pitch, or the like. The properties of the Bragg planes can be configured by configuring the orientation and/or the alignment of the LC molecules in the PVH layer. The effective chiral pitch p for the reflective PVHs shown in FIGS. 11A and 11B may be $$p = 2\frac{P_x^2 P_y}{P_x^2 + P_y^2} = P_B \cos\phi.$$

The wavelength band that may be reflected by the PVH may be between about $n_o p$ and about $n_e p$, where $n_o$ and $n_e$ are the ordinary refractive index and the extraordinary refractive index of the birefringent material. Within this reflection wavelength band, the diffraction efficiency to the first diffraction order may be close to 100%.

Figure 12B:
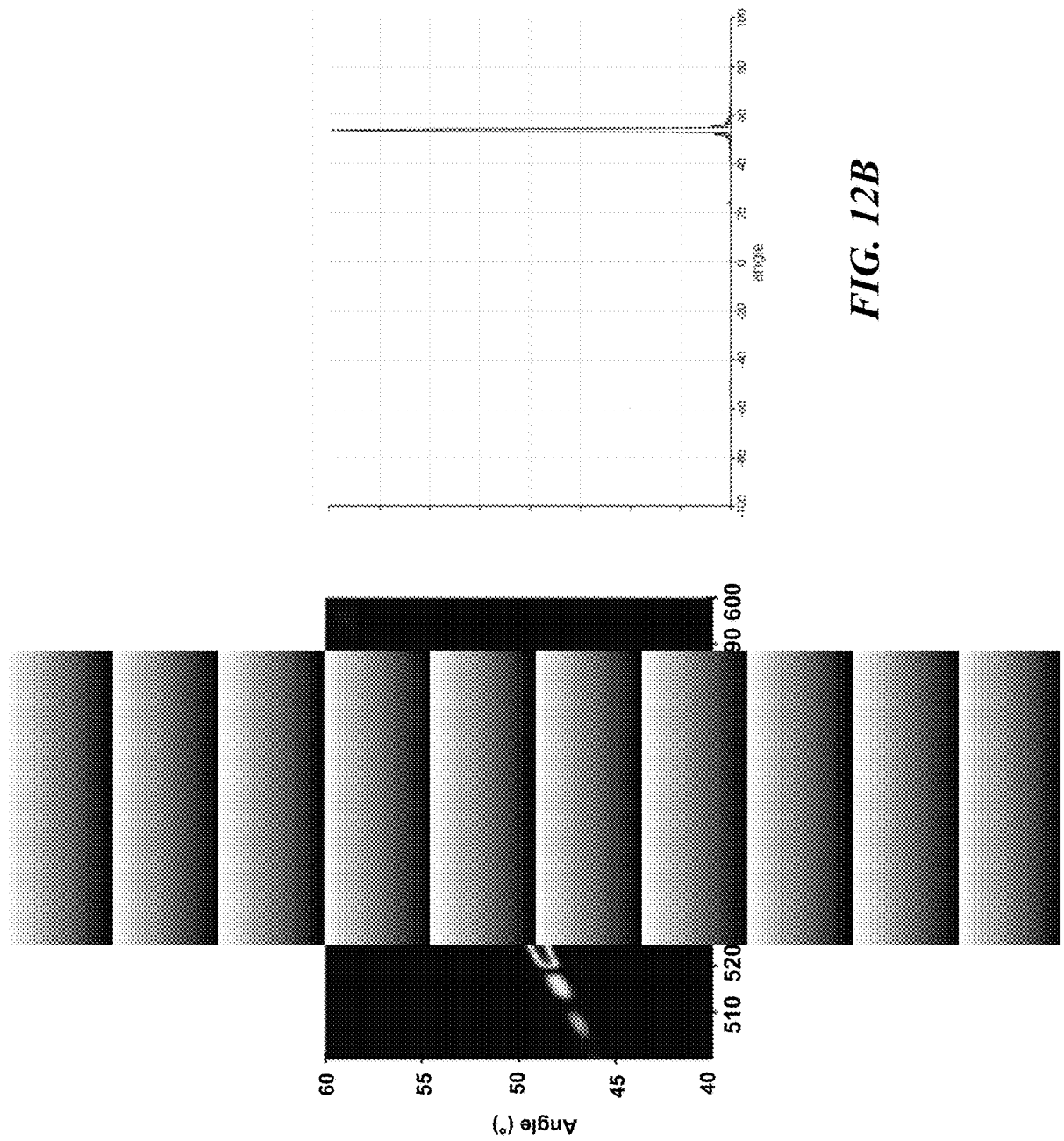
FIG. 12B illustrates diffraction angle and efficiency for light having a wavelength about 560 nm by an example of a slanted polarization volume hologram.

FIG. 12A illustrates light dispersion by an example of a polarization volume hologram. In the illustrated example, the birefringent material of the PVH may be characterized by an effective refractive index n=1.58 and a birefringence Δn between $n_e$ and $n_o$ about 0.15, and the PVH may be characterized by $P_x$=440 nm and $P_y$=205 nm. FIG. 12A illustrates the far field simulation results that show the diffraction efficiency and diffraction angle of surface-normal incident light as a function of the wavelength of the incident light. As illustrated, the reflection wavelength band of the example of the PVH may be between about 520 nm and about 570 nm. The diffraction angle may vary monotonically from about 48° to about 56° with the increase of the wavelength for light in this reflection wavelength band. FIG. 12B shows the diffraction angle and efficiency for light at about 560 nm by the example of the polarization volume hologram described above with respect to FIG. 12A.

The PVHs described above with respect to FIGS. 11A and 11B may be reflective PVHs, where light of a particular circular polarization state and in a certain reflection wavelength band may be reflectively diffracted into a first diffraction order by the PVHs while maintaining the circular polarization state of the diffracted light. PVHs may also be made to be transmissive PVHs, where light of a particular circular polarization state may be transmissively diffracted by the PVHs and the diffracted light may maintain the same circular polarization state. Transmissive PVHs may work for a broad wavelength band and may achieve a maximum diffraction efficiency at a designed working wavelength, where the diffraction efficiency may be a function of the refractive index modulation and the thickness of the transmissive PVHs.

FIGS. 13A-13D illustrate examples of transmissive PVHs according to certain embodiments. FIG. 13A shows an example of a primary transmissive PVH 1300 that includes an alignment layer 1310 and birefringent material molecules aligned to form a helical structure based on the alignment pattern in alignment layer 1310. Dashed lines 1320 show the Bragg planes (equal refractive index planes) and a dashed line 1330 shows the rotation plane of the birefringent material molecules (e.g., LC molecules). In primary transmissive PVH 1300, the Bragg planes may be perpendicular to alignment layer 1310, while the rotation plane of the birefringent material molecules may be parallel to alignment layer 1310. Thus, primary transmissive PVH 1300 may be a vertical transmissive PVH, where the grating vector K may be parallel to alignment layer 1310 or at an angle θ about 90° with respect to the surface-normal direction of alignment layer 1310.

FIG. 13B illustrates an example of a twisted transmissive PVH 1302 that includes an alignment layer 1312 and birefringent material molecules aligned to form a helical structure based on the alignment pattern in alignment layer 1312. Dashed lines 1322 show the Bragg planes and a dashed line 1332 shows the rotation plane of the birefringent material molecules. In twisted transmissive PVH 1302, the Bragg planes may be at an angle θ (e.g., >45°) with respect to alignment layer 1312, while the rotation plane of the birefringent material molecules may be parallel to alignment layer 1312. Therefore, twisted transmissive PVH 1302 may be a slanted transmissive PVH with a small slant angle (e.g., <45°) with respect to the surface-normal direction of alignment layer 1312, and thus may transmissively diffract incident light (e.g., surface-normal incident light). The Bragg pitch $P_B$ may be determined by $P_B=\lambda_0/(2n \sin \theta)$, where $\lambda_0$ is the wavelength of the incident light in the birefringent material and n is the effective refractive index of the birefringent material. The period $P_x$ along the x axis may be $P_x=\lambda_0/\sin \alpha$, where α is the diffraction angle in the birefringent material. The period $P_y$ along the y axis may be $P_y=P_x/\tan \theta$.

FIG. 13C illustrates an example of a slanted transmissive PVH 1304 that includes an alignment layer 1314 and birefringent material molecules aligned to form a helical structure based on the alignment pattern in alignment layer 1314. Dashed lines 1324 show the Bragg planes and a dashed line 1334 shows the rotation plane of the birefringent material molecules. In slanted transmissive PVH 1304, the Bragg planes may be at an angle θ (e.g., >45°) with respect to alignment layer 1314, while the rotation plane of the birefringent material molecules may be at a non-zero angle with respect to alignment layer 1312.

FIG. 13D illustrates an example of a pseudo transmissive PVH 1306 that includes an alignment layer 1316 and birefringent material molecules aligned to form a helical structure based on the alignment pattern in alignment layer 1316. Dashed lines 1326 show the Bragg planes and a dashed line 1336 shows the rotation plane of the birefringent material molecules. In pseudo transmissive PVH 1306, the Bragg planes may be at an angle θ (e.g., >45°) with respect to alignment layer 1316, while the rotation plane of the birefringent material molecules may be parallel to the Bragg planes.

As described above, both the reflective PVHs and the transmissive PVHs may achieve a high diffraction efficiency and a large diffraction angle. However, PVHs may be dispersive as shown by, for example, FIG. 12A. Metasurfaces may be able to achieve a desired phase delay profile, such as an achromatic phase profile, for multiple wavelengths, but achromatic metasurfaces may have low efficiencies (e.g., less than about 30%). According to certain embodiments, to achieve a large diffraction angle, a high diffraction efficiency, and an achromatic performance, an achromatic optical device (e.g., a flat beam deflector, lens, etc.) may include a PVH (or another substantially flat optical component) and a metasurface, where the metasurface may be used to correct the chromatic aberration of the PVH. In one example, the target phase of an achromatic device as a function of the location (e.g., the coordinates) on the achromatic device may be determined for multiple wavelengths, and the phase of a PVH as a function of the location may also be determined for the multiple wavelengths and may be subtracted from the target phase of the achromatic device to determine the desired phase delay of the metasurface as a function of the location for the multiple wavelengths. The metasurface itself may not be achromatic and may be designed as described above and below to achieve the desired phase delay. The metasurface may have a high packing density and thus may be able to achieve a high efficiency because the metasurface does not need to be achromatic and a large portion of the phase of the achromatic device may be contributed by the PVH. As such, the PVH and the metasurface, in combination, may achieve the desired high diffraction efficiency, large diffraction angle, and low chromatic aberration.

Figure 14A:
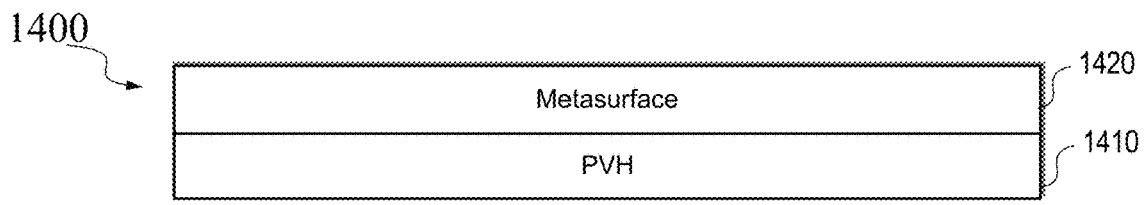
FIG. 14A illustrates an example of an achromatic light deflecting device including a polarization volume hologram and a metasurface according to certain embodiments.

FIG. 14A illustrates an example of an achromatic device 1400 including a polarization volume hologram 1410 and a metasurface 1420 arranged in a stack according to certain embodiments. Polarization volume hologram 1410 and metasurface 1420 may both be thin, substantially flat devices (planar or curved and having a uniform thickness). For example, PVH 1410 may include a layer of a birefringent material sandwiched by two substrates, where alignment patterns may be formed on one or more surfaces of the two substrates and molecules (e.g., LC molecules) of the birefringent material may aligned based on the alignment pattern to form a helical structure as described above. The layer of the birefringent material may have a thickness of, for example, a few microns or higher to form a polarization sensitive Bragg grating. Metasurface 1420 may include a transparent substrate (e.g., glass) and nanostructures formed thereon as described above and below, and may be above or below PVH 1410. In general, it may be desirable that the nanostructures are made of a material having a high refractive index such that the size of the nanostructures can be small to achieve a high packing density and thus a high efficiency, while still achieving resonance at the working wavelengths (e.g., visible light) and the desired phase shifts at the working wavelengths. For example, the nanostructures may be made of a semiconductor material, such as silicon.

In one example, achromatic device 1400 may be a light deflecting device that may be used to reflect incident light of multiple wavelengths to a same direction. The generalized Snell's law of reflection may be represented by:

$$n_r\sin\alpha - n_i\sin\theta_i = \frac{\lambda}{2\pi}\frac{d\varphi}{dx} = \frac{1}{k}\frac{d\varphi}{dx},$$

where $\theta_i$ is the incident angle, α is the reflection angle (diffraction angle for reflective PVH), $n_i$ is the refractive index of the incident medium, $n_r$ is the refractive index of the output medium (and may be the same as $n_i$ in reflective light deflecting devices), λ is the wavelength of the incident light in free space, $$k = \frac{2\pi}{\lambda}$$

is the wave number, and φ is the phase shift associated with the reflection, which is a function of the position of achromatic device 1400. For surface-normal incidence, $\theta_i$ may be zero and the reflection law may be simplified to $$\sin\alpha = \frac{1}{nk}\frac{d\varphi}{dx}.$$

Thus, the target phase shift φ(f, x) of the achromatic light deflecting device may be:

$$\varphi(f, x) = n\frac{2\pi}{c}\sin\alpha fx + af + b,$$

where f is the frequency of the incident light, and c is the speed of light in free space.

Figure 14B:
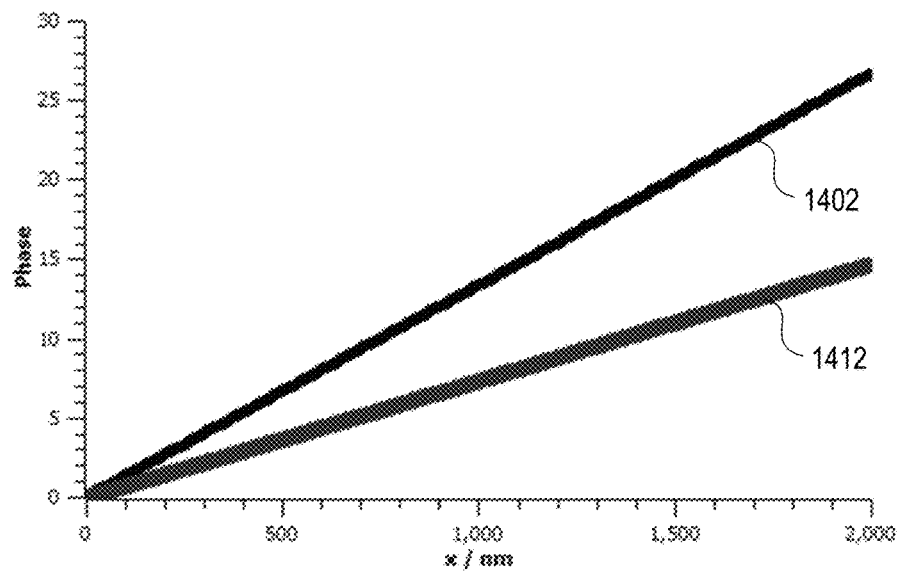
FIG. 14B illustrates the target phase delay of the example of the achromatic light deflecting device shown in FIG. 14A and the phase delay of the polarization volume hologram for light of a first wavelength according to certain embodiments.

FIG. 14B illustrates the target phase delay φ(f, x) of the example of achromatic device 1400 and the phase delay of PVH 1410 for light of a first wavelength (e.g., λ=570 nm, or f≈526 THz) according to certain embodiments. In FIG. 14B, the horizontal axis corresponds to the horizontal location of achromatic device 1400, and the vertical axis corresponds to the phase shift (in radians) at the corresponding horizontal location. A line 1402 shows the target phase shift φ(f, x) of achromatic device 1400 that may deflect surface-normal incident light by 50°, whereas a line 1412 shows the phase of PVH 1410 that may deflect incident light by a certain angle, such as 25°. In various embodiments, PVH 1410 may be designed to deflect the incident light by any angle, such as between about 0° and about 90°. The difference between the target phase shift of achromatic device 1400 and the phase shift of PVH 1410 may be achieved by metasurface 1420. For example, when the deflection angle of PVH 1410 is the same as the target deflection angle of achromatic device 1400, metasurface 1420 may be used primarily to correct the chromatic aberrations of PVH 1410.

Figure 14C:
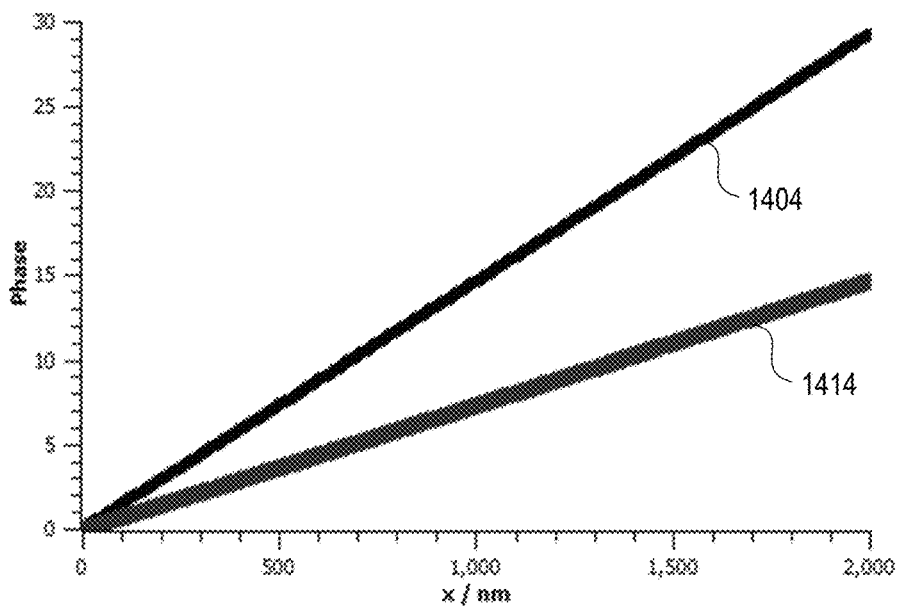
FIG. 14C illustrates the target phase delay of the example of the achromatic light deflecting device shown in FIG. 14A and the phase delay of the polarization volume hologram for light of a second wavelength according to certain embodiments.

FIG. 14C illustrates the target phase delay of the example of achromatic device 1400 and the phase delay of PVH 1410 for light of a second wavelength (e.g., λ=520 nm, or f≈577 THz) according to certain embodiments. In FIG. 14C, the horizontal axis corresponds to the horizontal location of achromatic device 1400, and the vertical axis corresponds to the phase shift (in radians) at the corresponding horizontal location. A line 1404 shows the target phase shift φ(f, x) of achromatic device 1400 that may deflect surface-normal incident light by 50°, whereas a line 1414 shows the phase of PVH 1410 that may deflect incident light by a certain angle, such as 25°. As described above, PVH 1410 may be designed to deflect the incident light by any angle, such as any angle between about 0° and about 90°. The difference between the phase shift of achromatic device 1400 and the phase shift of PVH 1410 may be achieved by metasurface 1420.

Figure 14D:
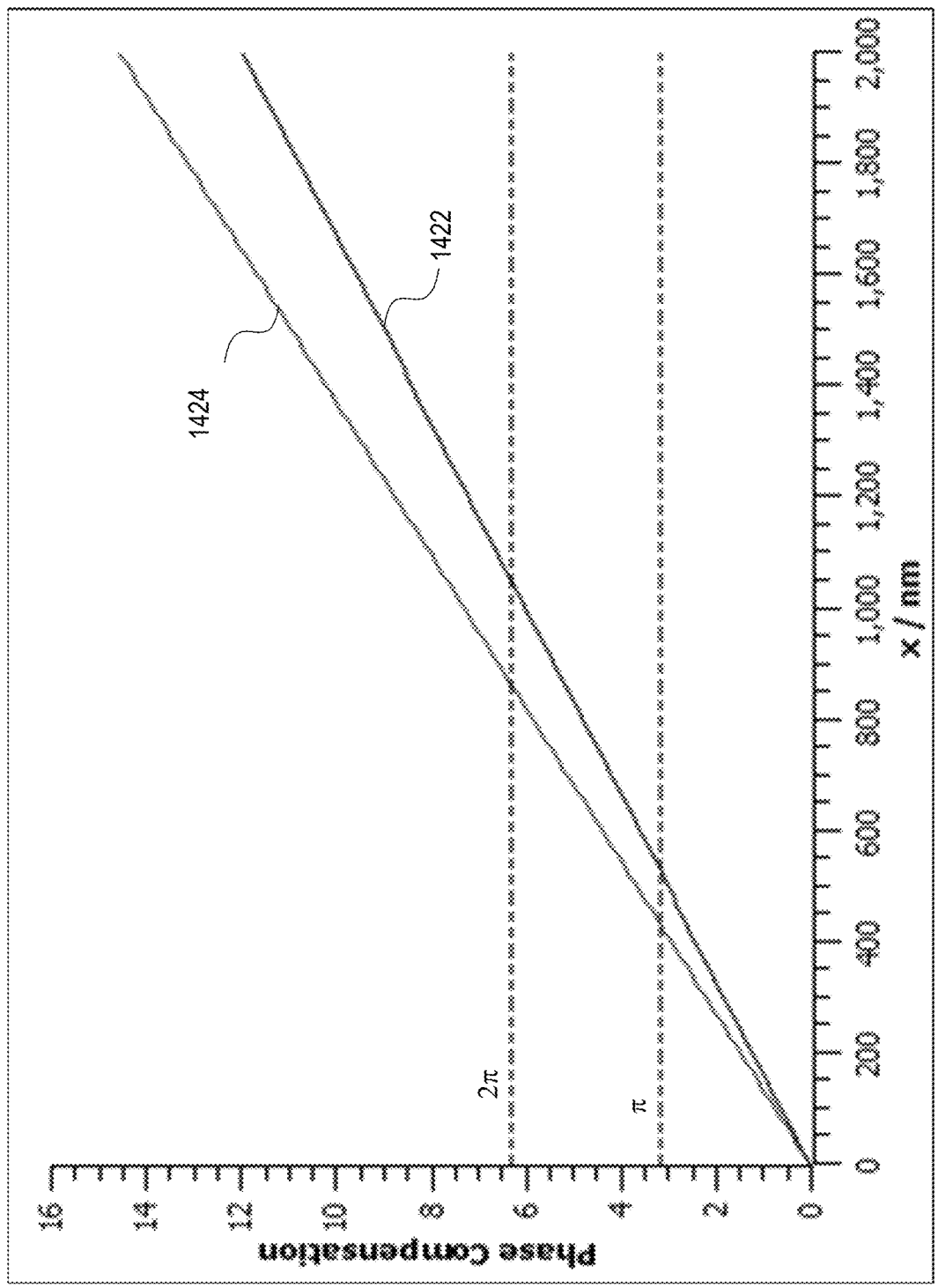
FIG. 14D illustrates the desired phase delays of the metasurface of the example of the achromatic light deflecting device shown in FIG. 14A for incident light of different wavelengths according to certain embodiments.

FIG. 14D illustrates the desired phase delays of metasurface 1420 for incident light of different wavelengths according to certain embodiments. In FIG. 14D, the horizontal axis corresponds to the horizontal location of achromatic device 1400, and the vertical axis corresponds to the desired phase shift (in radians) of metasurface 1420 at the corresponding horizontal location. A line 1422 shows the desired phase shift of metasurface 1420 for incident light having a wavelength of 570 nm (f≈526 THz), whereas a line 1424 shows the desired phase shift of metasurface 1420 for incident light having a wavelength of 520 nm (f≈577 THz). As described above (e.g., with respect to FIG. 9B), metasurface 1420 can be designed to achieve the desired phase delays for multiple wavelengths at each location of a plurality of locations on metasurface 1420.

Figures 15A, 15B:
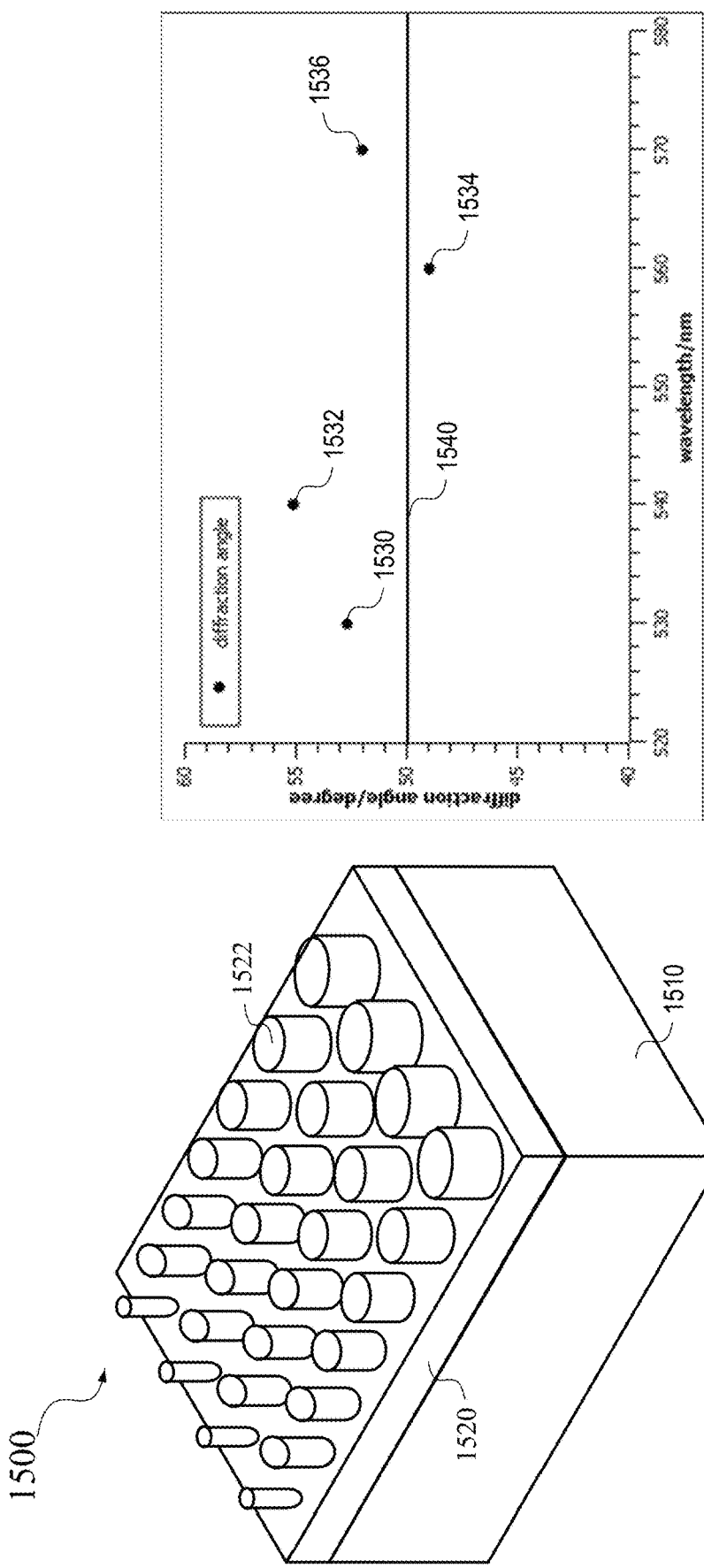
FIG. 15A illustrates an example of an achromatic light deflecting device including a polarization volume hologram and a metasurface according to certain embodiments.
FIG. 15B illustrates diffraction angles of the achromatic light deflecting device of FIG. 15A for surface-normal incident light of different wavelengths according to certain embodiments.
Figure 16A:
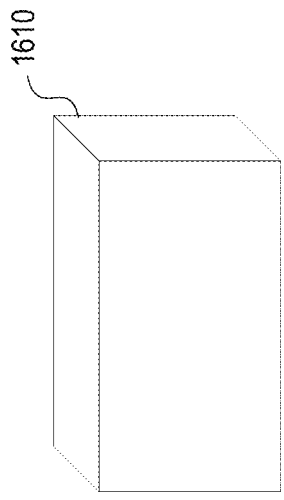
FIGS. 16A-16H illustrate examples of nanostructures of a metasurface according to certain embodiments.
Figure 16B:
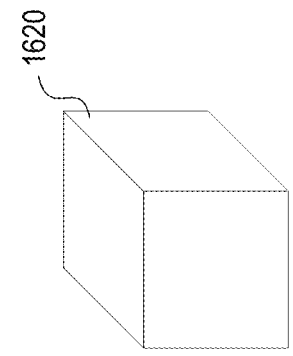
Figure 16C:
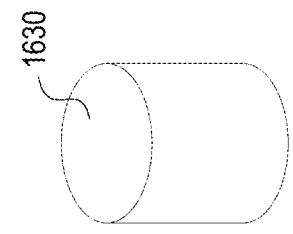
Figure 16D:
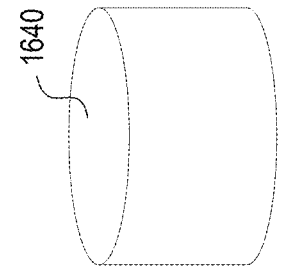
Figure 16E:
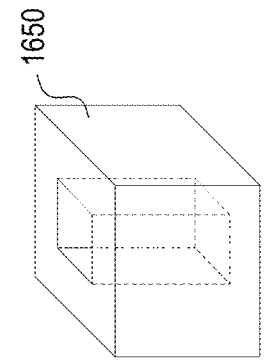
Figure 16F:
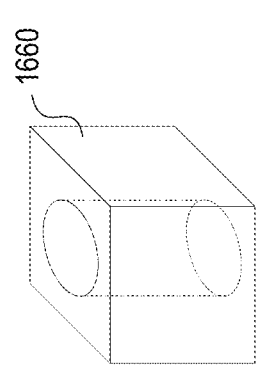
Figure 16G:
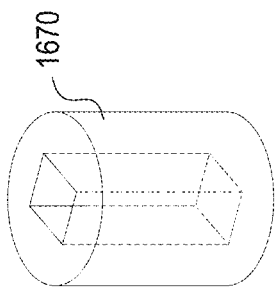
Figure 16H:
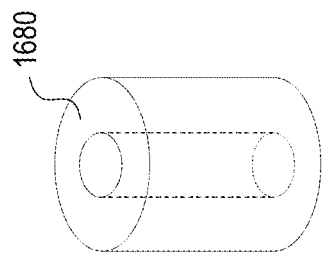

FIG. 15A illustrates an example of an achromatic light deflecting device 1500 including a polarization volume hologram 1510 and a metasurface 1520 according to certain embodiments. Achromatic light deflecting device 1500 may be an example of achromatic device 1400. PVH 1510 may include a reflective or transmissive PVH as described above. Metasurface 1520 may include a plurality of nanostructures 1522 formed on a substrate. Nanostructures 1522 may include a high refractive index material (e.g., Si, SiN, TiO$_2$, or another high index and low absorption material) and thus may have small sizes, such that the packing density of metasurface 1520 may be high to achieve a high efficiency.

In the illustrated example, nanostructures 1522 of metasurface 1520 may have a cylindrical shape and may have the same height but different diameters. In some embodiments, nanostructures 1522 may have the same pitch (between centers of adjacent nanostructures) or different pitches. In some embodiments, nanostructures 1522 may have different shapes, different heights, different diameters, and/or different orientations (e.g., tilt angles). In some embodiments, metasurface 1520 may be below PVH 1510. In some embodiments, achromatic light deflecting device 1500 may include a metasurface on top of PVH 1510 and a metasurface below PVH 1510.

FIG. 15B illustrates diffraction angles of achromatic light deflecting device 1500 of FIG. 15A for light of different wavelengths according to certain embodiments. The target deflection angle of achromatic light deflecting device 1500 may be about 50° as shown by a line 1540. The deflection angles for incident light at 530 nm, 540 nm, 560 nm, and 570 nm may be shown by points 1530, 1532, 1534, and 1536, respectively in FIG. 15B. As illustrated, the deflection angle may be centered around 50°, rather than linearly increasing with the increase of the wavelength of the incident light shown in FIG. 12A. The overall efficiency of achromatic light deflecting device 1500 may be greater than about 50%, greater than about 60%, greater than about 75%, greater than about 80%, greater than about 90%, greater than about 95%, greater than about 99%, or higher.

FIGS. 16A-16H illustrate some examples of nanostructures of a metasurface according to certain embodiments. Each nanostructure may be a resonator that may be designed to resonate under a certain condition to modify the phase of incident light by a certain value. As illustrated, the nanostructures may include, for example, a rectangular prism 1610, a cube 1620, a cylinder 1630, an elliptic cylinder 1640, a rectangular prism 1650 with a rectangular cavity in the center, a rectangular prism 1660 with a cylindrical cavity in the center, a cylinder 1670 with a rectangular cavity in the center, a cylinder 1680 with a cylindrical cavity in the center, or the like. Other regular or irregular shaped nanostructures may also be used. In some embodiments, nanostructures having different shapes may be used in a same metasurface.

As described above, the nanostructures of a metasurface used with a PVH to form an achromatic device may be made of a high index material, such as silicon, polysilicon, silicon nitride, titanium oxide, or the like. In some embodiments, high index materials that are transparent to visible light may be used. In some embodiments, the thickness (height) of the nanostructures may be between about 50 nm and about 2 μm. In some embodiments, the width (e.g., diameter or side) of the nanostructures may be between about 10 nm and about 500 nm. In some embodiments, the nanostructures may be one-dimensional or two-dimensional structures and/or may be arranged along one direction, two directions, or according to a certain pattern.

Figure 17A:
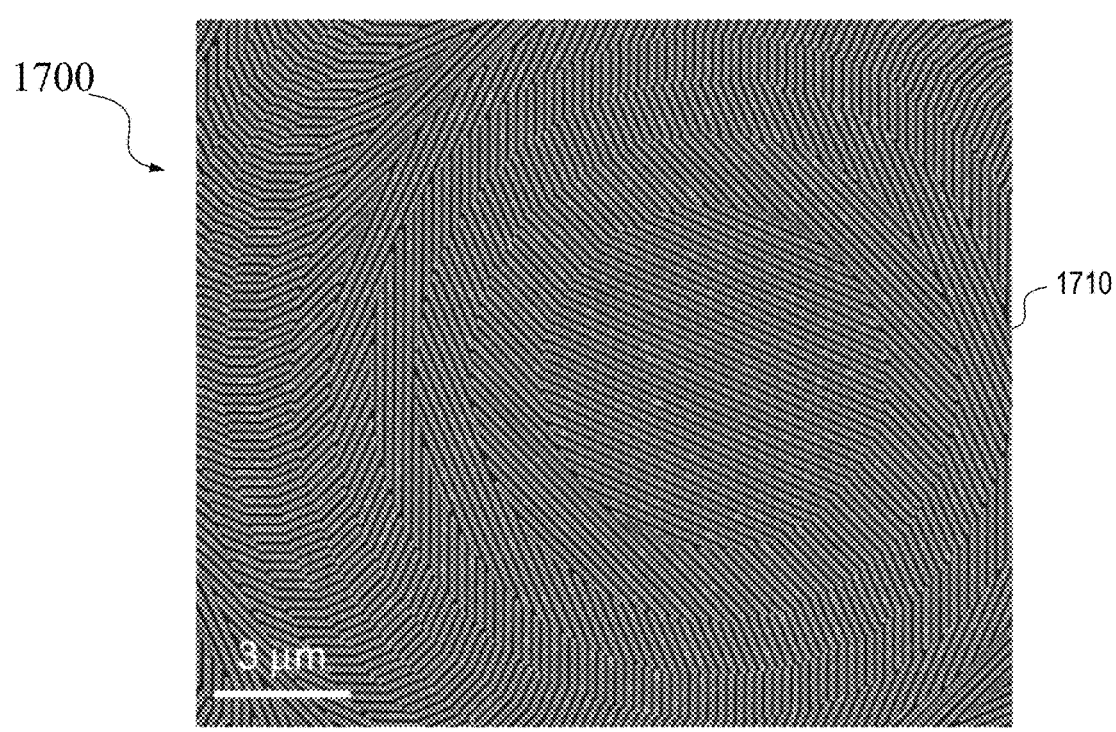
FIG. 17A illustrates an example of a metasurface including nanostructures having different orientations according to certain embodiments.

FIG. 17A illustrates an example of a metasurface 1700 including nanostructures 1710 having different orientations according to certain embodiments. Metasurface 1700 may perform the function of an axion and may transform a circularly polarized uniform light beam into a ring-shaped beam. As illustrated, metasurface 1700 may include thousands of nanostructures 1710 that have different sizes (e.g., lengths) and orientations and are arranged according to a two-dimensional pattern.

Figure 17B:
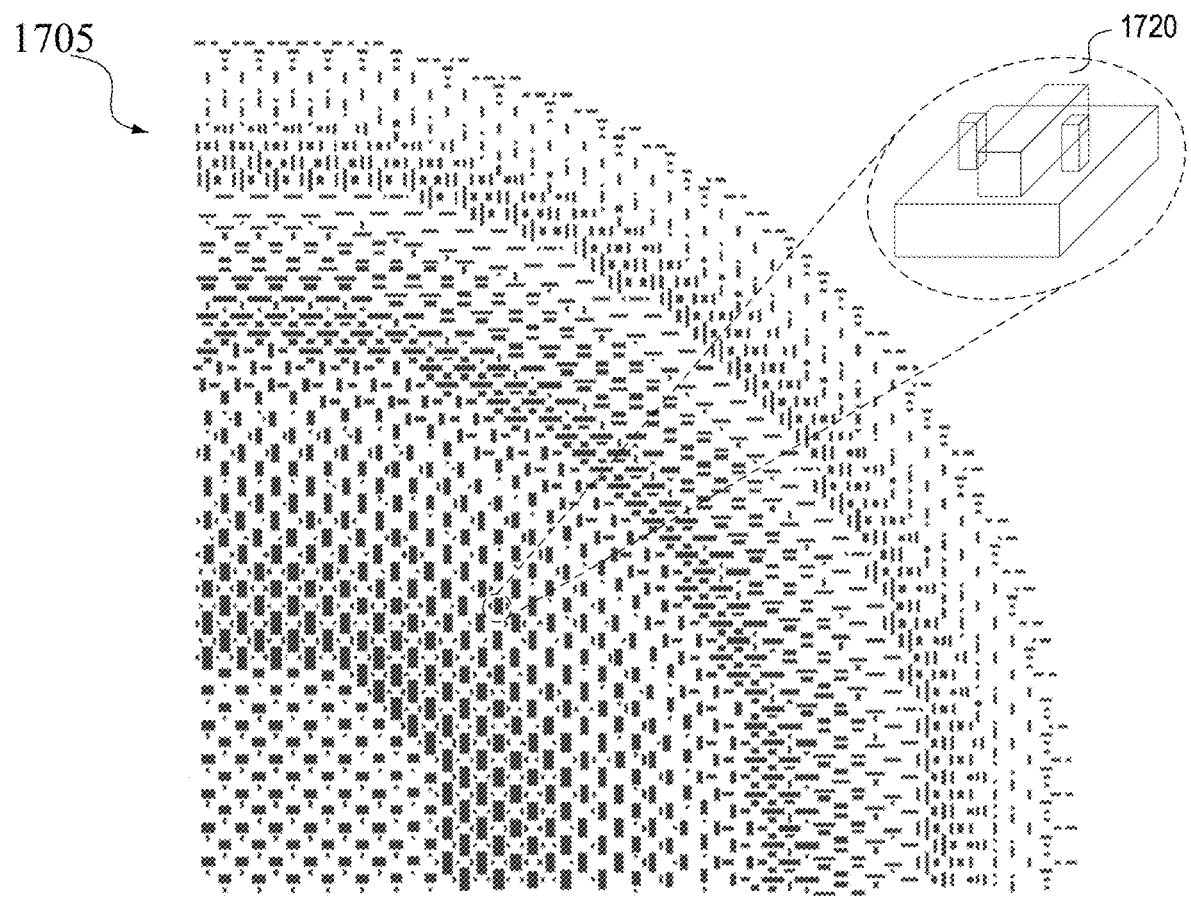
FIG. 17B illustrates an example of a metasurface including units having multiple nanostructures according to certain embodiments.

FIG. 17B illustrates a portion of another example of a metasurface 1705 including some meta-units having multiple coupled nanostructures according to certain embodiments. One example of a meta-unit 1720 is shown in the insert. Meta-unit 1720 may include one large nanostructure and two small nanostructures, where the large nanostructure and the two small nanostructures may be coupled to form a resonator. The size of the large nanostructure and the sizes of the two small nanostructures may be different for different meta-units. As illustrated, some meta-units may each include two coupled nanostructures, while some meta-units may each include one nanostructure.

FIGS. 18A-18C illustrate an example of a method of fabricating a metasurface according to certain embodiments. As shown in FIG. 18A, a layer 1820 of a high refractive index material, such as silicon, polysilicon, silicon nitride, or a high-index material that is transparent to visible light, may be formed (e.g., deposited) on a transparent substrate 1810. Transparent substrate 1810 may include, for example, glass, quartz, ceramic, plastic, or crystal.

FIG. 18B shows a patterned etch mask layer 1830 formed on layer 1820. Patterned etch mask layer 1830 may be formed by depositing (e.g., spin-coating) a layer of an E-beam resist on layer 1820, writing patterns in the E-beam resist by exposing the E-beam resist using an E-beam, and then developing the exposed E-beam resist. Patterned mask layer 1830 may have a pattern that is complimentary to a cross-section of the nanostructures to be formed in layer 1820. An etching process may then be performed using patterned etch mask layer 1830 to form individual nanostructures in layer 1820.

FIG. 18C shows a metasurface formed in layer 1820 on substrate 1810. The metasurface may include nanostructures 1822 that may have the same or similar height but different sizes and/or pitches. Nanostructures 1822 may be arranged according to a one-dimensional or two-dimensional pattern as described above.

FIGS. 18D-18F illustrate another example of a method of fabricating a metasurface according to certain embodiments. As shown in FIG. 18D, a patterned deposition mask layer 1860 may be formed on a substrate 1850. As substrate 1810, substrate 1850 may include a transparent material, such as glass, quartz, ceramic, or crystal. Patterned deposition mask layer 1860 may be formed on substrate 1850 by depositing a layer of an E-beam resist on substrate 1850, writing patterns in the E-beam resist by exposing the E-beam resist using an E-beam, and then developing the exposed E-beam resist. Patterned deposition mask layer 1860 may have a pattern that may be complimentary to a cross-section of the nanostructures to be formed.

FIG. 18E shows that a layer 1870 of a high refractive index material, such as silicon, polysilicon, silicon nitride, or a high-index material that is transparent to visible light, may be deposited on patterned deposition mask layer 1860. Layer 1870 of the high refractive index material may fill the gaps in patterned mask layer 1860. The thickness of layer 1870 may be controlled to a desired thickness of nanostructures.

FIG. 18F shows that patterned deposition mask layer 1860 that includes E-beam resist may be removed by a resist stripping process or a exposure and development process. Layer 1870 on patterned deposition mask layer 1860 may be removed due to the removal of the E-beam resist. Layer 1870 between the gaps in patterned deposition mask layer 1860 may remain on substrate 1850 to form the nanostructures of the metasurface. Because the nanostructures in layer 1870 is formed in cavities by a deposition process rather than an etching process that may damage the sidewalls of the nanostructures, the quality of the nanostructures formed using the process shown in FIGS. 18D-18F may be better than the quality of the nanostructures formed using the process shown in FIGS. 18A-18C.

After the formation of the metasurface on a transparent substrate (e.g., substrate 1810 or 1850), a PVH may be formed on the transparent substrate to form an achromatic device. In some embodiments, the transparent substrate having the metasurface formed thereon may be used as a substrate for the PVH. For example, an alignment pattern may be formed on a side of the substrate opposing the metasurface, and a birefringent material including birefringent material molecules and chiral dopants may be deposited on the substrate. The birefringent material molecules may then self-align to form the helical structure in the PVH.

FIGS. 19A-19C illustrate an example of a method of forming a polarization volume hologram on a metasurface substrate to form an achromatic optical device according to certain embodiments. As illustrated in FIG. 19A, a metasurface 1920 formed on a substrate 1910 using techniques described above with respect to FIGS. 18A-18F may be flipped over, and a photoalignment material (PAM) layer 1930 (a photocurable monomer layer) may be deposited on the side of the substrate opposing the metasurface. A photoalignment process may then be performed to form an alignment pattern in PAM layer 1930. For example, an interference pattern generated using two polarized beams may be used to selectively polymerize the photocurable monomers in PAM layer 1930 to form a cycloidal pattern in PAM layer 1930.

FIG. 19B shows a layer 1940 of LC precursors coated or sprayed on PAM layer 1930. The LC precursors may include LC molecules, photocurable monomers, and chemicals such as a solvent, a photo-initiator, a chiral dopant, and/or a surfactant. The liquid crystal molecules may self-align to the alignment pattern in PAM layer 1930 to form the polarization volume grating as described above. After the alignment process, layer 1940 of the LC precursors may be exposed to unpolarized uniform ultra-violet light to polymerize the photocurable monomers in layer 1940 of the LC precursors, where the polymers may fix or stabilize the LC molecules to form a PVH 1942 as shown in FIG. 19C.

In some embodiments, a second substrate may be positioned on layer 1940 before the photocurable monomers are polymerized and the LC molecules forming the helical structures are fixed. In some embodiments, the second substrate may also include an alignment pattern for aligning the LC molecules, where the alignment pattern may be formed in a photoalignment material layer as described above. In some embodiments, a second metasurface may be formed on the second substrate, where metasurface 1920, the second metasurface, and PVH 1942 may, in combination, achieve the desired overall phase profile and achromatic performance. For example, metasurface 1920 and the second metasurface may, in combination, correct the chromatic aberrations of PVH 1942.

Figure 20:
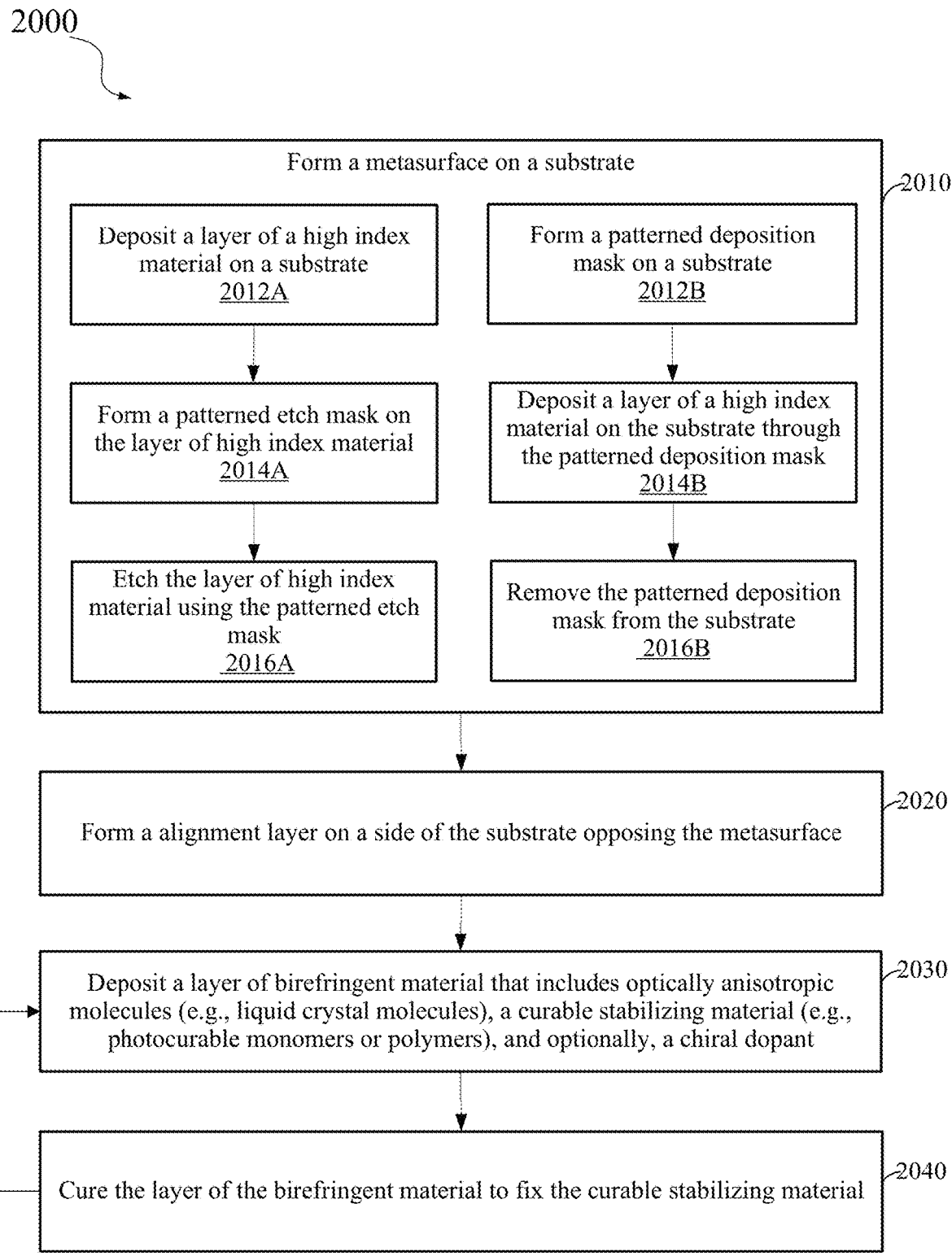
FIG. 20 includes a flowchart illustrating an example of a process of fabricating an achromatic optical device including a polarization volume hologram and a metasurface according to certain embodiments.

FIG. 20 includes a flowchart 2000 illustrating an example of a process for fabricating an achromatic optical device including a polarization volume hologram and a metasurface according to certain embodiments. The operations described in flowchart 2000 are for illustration purposes only and are not intended to be limiting. Other sequences of operations can also be performed according to alternative embodiments. For example, alternative embodiments may perform the operation in a different order. Moreover, the individual operations illustrated in FIG. 20 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives.

Operations at block 2010 may include forming a metasurface on a substrate. As described above, the substrate may include a transparent material, such as glass, quartz, ceramic, or crystal. The metasurface may include a high refractive index material (e.g., with a refractive index equal to or greater than about 1.8 or 2.0), such as silicon, polysilicon, silicon nitride, titanium oxide, other high refractive index oxides, or a metal. Several techniques may be used to form the metasurface on the substrate.

In one example (e.g., shown by FIGS. 18A-18C), at block 2012A, a layer of the high refractive index material (e.g., silicon) may be deposited on the substrate. The thickness of the layer of the high refractive index material may be equal to the desired thickness of the nanostructures of the metasurface, such as between about 50 nm and about 2 µm or higher. At block 2014A, a patterned etch mask may be formed on the layer of the high refractive index material. The patterned etch mask may be formed by depositing (e.g., spin-coating) a layer of an E-beam resist on the layer of the high refractive index material, writing patterns in the E-beam resist by exposing the E-beam resist using an E-beam, and then developing the exposed E-beam resist to form a pattern that may be complimentary to the pattern of the nanostructures of the metasurface. At block 2016A, an etching (e.g., dry or wet etching) process may be performed to etch the layer of the high refractive index material using the patterned etch mask to form nanostructures in the layer of the high refractive index material. The nanostructures may have the same height, but may have different sizes, shapes, orientations, and/or pitches as described above. For example, the nanostructures may have widths (e.g., a diameter or a side) between about 10 nm and about 500 nm.

In another example (e.g., shown by FIGS. 18D-18F), at block 2012B, a patterned deposition mask may first be formed on the substrate. The patterned deposition mask may be formed on the substrate by depositing a layer of an E-beam resist on the substrate, writing patterns in the E-beam resist by exposing the E-beam resist using an E-beam, and then developing the exposed E-beam resist to form a pattern that may be complimentary to the pattern of the nanostructures of the metasurface. At block 2014B, a layer of the high index material may be deposited on the substrate through the patterned deposition mask. The thickness of the layer of the high refractive index material may be equal to the desired thickness of the nanostructures of the metasurface, such as between about 50 nm and about 2 µm or higher. At block 2016B, the patterned deposition mask may be removed from the substrate using, for example, a resist stripping process or a exposure and development process. The layer of the high refractive index material deposited on the patterned deposition mask may be removed with the patterned deposition mask, while the layer of the high refractive index material deposited on the substrate through the patterned deposition mask may remain on the substrate and form the nanostructures of the metasurface. The nanostructures may have the same height, but may have different sizes, shapes, orientations, and/or pitches as described above. For example, the nanostructures may have widths (e.g., a diameter or a side) between about 10 nm and about 500 nm.

Operations at block 2020 may include forming an alignment layer on a surface of the substrate opposing the metasurface, where orientations of patterns in the alignment layer vary across the alignment layer. The alignment layer may be formed on the surface of the substrate by, for example, depositing a photoalignment material layer (e.g., a photocurable monomer material) on the surface of the substrate, and exposing the photoalignment material layer to an interference pattern generated by two overlapping circularly polarized light beams. The exposure of the photoalignment material layer to the interference pattern may cause the polymerization of the photocurable monomers in the photoalignment material layer at the bright regions of the interference pattern to form polymerized chains in the photoalignment material layer according to the interference pattern.

In one example, the photoalignment material may include brilliant yellow (BY) dissolved in dimethylformamide (DMF), and may be spin-coated on the surface of the substrate. After the spin-coating, the photoalignment material (e.g., BY) layer may be dried by, for example, baking at an elevated temperature (e.g., greater than about 100° C.) to remove the solvent. A left-handed circularly polarized beam and a right-handed circularly polarized beam having desired incident angles may be incident on a same area of the photoalignment material layer to generate polarized interference patterns and record the polarized interference patterns in the photoalignment material layer. The incident angles of the two circularly polarized beams may be selected to achieve the desired periodicity and pattern in the alignment layer.

Operations at block 2030 may include depositing a layer of a birefringent material on the alignment layer. The birefringent material may include optically anisotropic molecules and a curable stabilizing material. For example, the birefringent material may include liquid crystal molecules mixed with photocurable monomers or polymers. The birefringent material may have a birefringence greater than about 0.1, greater than about 0.15, greater than about 0.2, or larger. In some embodiments, the birefringent material may also include a photo-initiator (e.g., Irgacure 651) and/or a chiral dopant (e.g., R 5011). The optically anisotropic molecules in the layer of the birefringent material deposited on the alignment layer may align with patterns in the alignment layer to form helical structures. In some embodiments, the layer of the birefringent material may be thermally cured to create a smooth and uniform layer.

Operations at block 2040 may include curing the layer of the birefringent material to fix the curable stabilizing material, which may stabilize the helical structures in the layer of the birefringent material. In one example, the curing may be performed by exposing the layer of the birefringent material using a uniform UV light beam to polymerize the photocurable monomers or cross-link the polymers to form cross-linked polymers. The layer of the birefringent material with the helical structures formed therein by the optically anisotropic molecules and stabilized or fixed by the crosslinked polymers may be a PVH that may diffract a circularly polarized beam having the same handedness as the helical structures in the PVH to a first diffraction order at a high efficiency (e.g., >50%, >60%, >75%, >80%, >90%, >95%, or >99%).

In some embodiments, to achieve a desire thickness in order to form a PVH, operations at blocks 2030 and 2040 may be repeated for multiple iterations, where the operations in each iteration may form a thin sublayer of the PVH.

Techniques disclosed herein may also be used to implement achromatic optical devices that include metasurfaces for correcting chromatic aberrations of other optical devices, such as holographic optical elements (HOEs) or other diffraction optical elements (DOEs), geometric phase devices (e.g., Pancharatnam-Berry phase (PBP) lenses), other substantially flat reflective or refractive optical devices (planar or curved but with a uniform thickness), and the like.

Techniques disclosed herein may be used to implement substantially flat achromatic optical devices with many different functions and phase profiles, such as reflective or transmissive lenses, reflective or transmissive beam deflectors (e.g., prism), off-axis lenses, micro-lens arrays, beam-shaping element (e.g., axicon), and the like. The achromatic optical devices implemented using PVHs and metasurfaces may be used in many applications, such as imaging, illumination, beam-shaping, nanofabrication, communication, 3-D display, light field sensing, beam homogenizing, spectrometer, holographic imaging, AR/VR display, light detection and ranging (LiDAR), bio-medical applications, and the like. Some examples of the application of the achromatic optical devices disclosed here are described below.

Figure 21B:
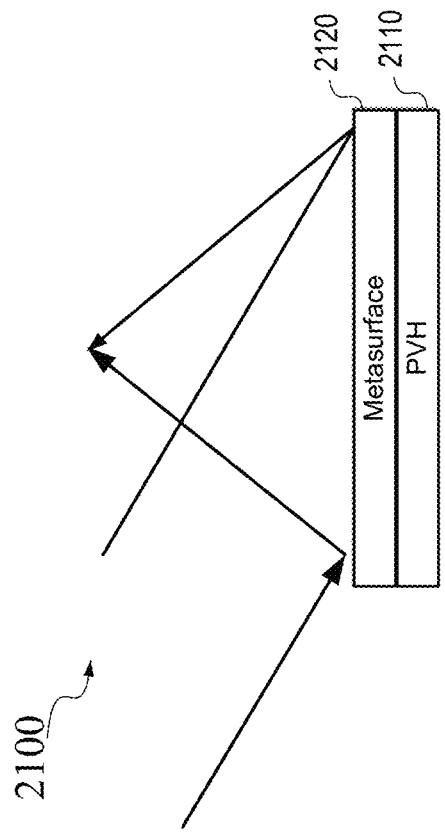
FIG. 21B illustrates an example of an achromatic reflective light deflector including a polarization volume hologram and a metasurface according to certain embodiments.
Figure 21A:
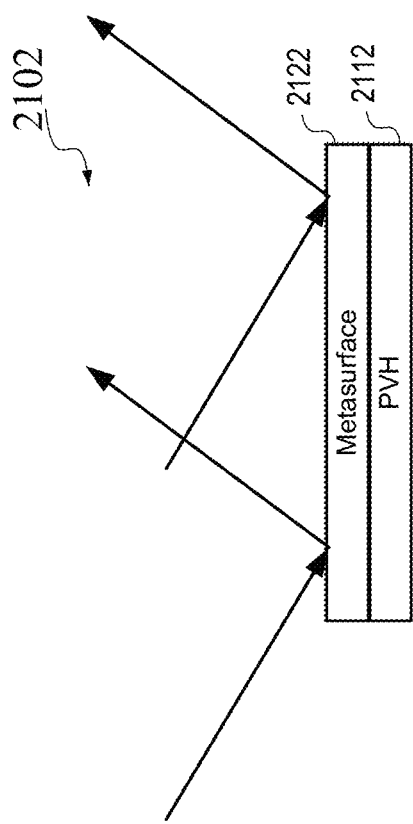
FIG. 21A illustrates an example of an achromatic reflective lens including a polarization volume hologram and a metasurface according to certain embodiments.

FIG. 21A illustrates an example of an achromatic reflective lens 2100 including a PVH 2110 and a metasurface 2120 according to certain embodiments. Achromatic reflective lens 2100 may be a substantially flat optical device. In some embodiments, achromatic reflective lens 2100 and/or PVH 2110 may have a curved shape but may have a uniform thickness. PVH 2110 and metasurface 2120 may be designed and fabricated using techniques described above. Even though FIG. 21A shows metasurface 2120 on PVH 2110, in other embodiments, metasurface 2120 may be below PVH 2110. Achromatic reflective lens 2100 may be used, for example, for retinal projection. In the illustrated example, achromatic reflective lens 2100 may focus incident light (e.g., circularly polarized light) in different wavelengths and from a light source (not shown in FIG. 21A) to form an image that may be on the same side of achromatic reflective lens 2100 as the light source. In some embodiments, PVH 2110 may be replaced by an HOE or a geometric phase device.

FIG. 21B illustrates an example of an achromatic reflective light deflector 2102 including a PVH 2112 and a metasurface 2122 according to certain embodiments. Achromatic reflective light deflector 2102 may be a substantially flat optical device. In some embodiments, achromatic reflective light deflector 2102 and/or PVH 2112 may have a curved shape but may have a uniform thickness. PVH 2112 and metasurface 2122 may be designed and fabricated using techniques described above. Even though FIG. 21B shows metasurface 2122 on PVH 2112, in other embodiments, metasurface 2122 may be below PVH 2112. In some embodiments, PVH 2112 may be replaced by an HOE or a geometric phase device. In the illustrated example, achromatic reflective light deflector 2102 may perform the function of a reflective grating (e.g., a blazed grating) that may direct incident light (e.g., circularly polarized light) in different wavelengths and from a certain direction to a desired direction, where the incident light and the reflected light may be on the same side (e.g., top side shown in FIG. 21B) of achromatic reflective light deflector 2102.

Figure 22B:
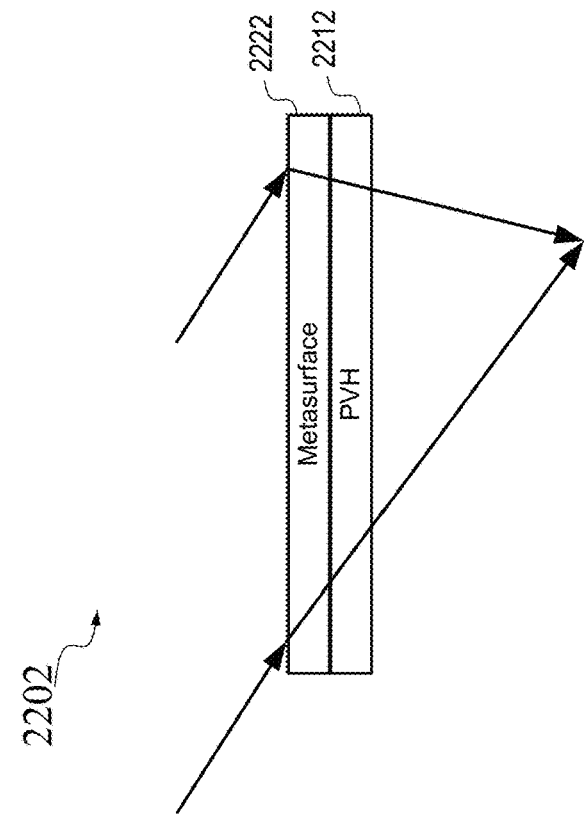
FIG. 22B illustrates an example of an achromatic transmissive lens including a polarization volume hologram and a metasurface according to certain embodiments.
Figure 22A:
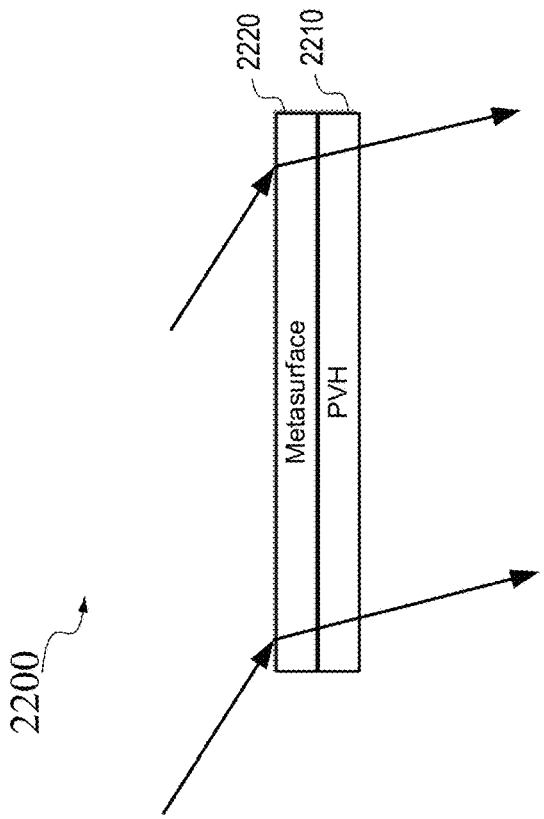
FIG. 22A illustrates an example of an achromatic transmissive light deflector including a polarization volume hologram and a metasurface according to certain embodiments.

FIG. 22A illustrates an example of an achromatic transmissive light deflector 2200 including a PVH 2210 and a metasurface 2220 according to certain embodiments. Achromatic transmissive light deflector 2200 may be a substantially flat optical device. In some embodiments, achromatic transmissive light deflector 2200 and/or PVH 2210 may have a curved shape but may have a uniform thickness. PVH 2210 and metasurface 2220 may be designed and fabricated using techniques described above. Even though FIG. 22A shows metasurface 2220 on PVH 2210, in other embodiments, metasurface 2220 may be below PVH 2210. In some embodiments, PVH 2210 may be replaced by an HOE or a geometric phase device. In the illustrated example, achromatic transmissive light deflector 2200 may perform the function of a transmissive grating that may direct incident light (e.g., circularly polarized light) in different wavelengths and from a certain direction to a desired direction, where the incident light and the deflected light may be on opposite sides of achromatic transmissive light deflector 2200.

FIG. 22B illustrates an example of an achromatic transmissive lens 2202 including a polarization volume hologram 2212 and a metasurface 2222 according to certain embodiments. Achromatic transmissive lens 2202 may be a substantially flat optical device. In some embodiments, achromatic transmissive lens 2202 and/or PVH 2212 may have a curved shape but may have a uniform thickness. PVH 2212 and metasurface 2222 may be designed and fabricated using techniques described above. Even though FIG. 22B shows metasurface 2222 on PVH 2212, in other embodiments, metasurface 2222 may be below PVH 2212. Achromatic transmissive lens 2202 may be used, for example, for imaging, illumination, beam collimation, or the like. In the illustrated example, achromatic transmissive lens 2202 may focus incident light (e.g., circularly polarized light) having different wavelengths from a light source (not shown in FIG. 22A) to form an image that may be on a side of achromatic transmissive lens 2202 opposing the light source. In some embodiments, PVH 2212 may be replaced by an HOE or a geometric phase device.

Figure 23A:
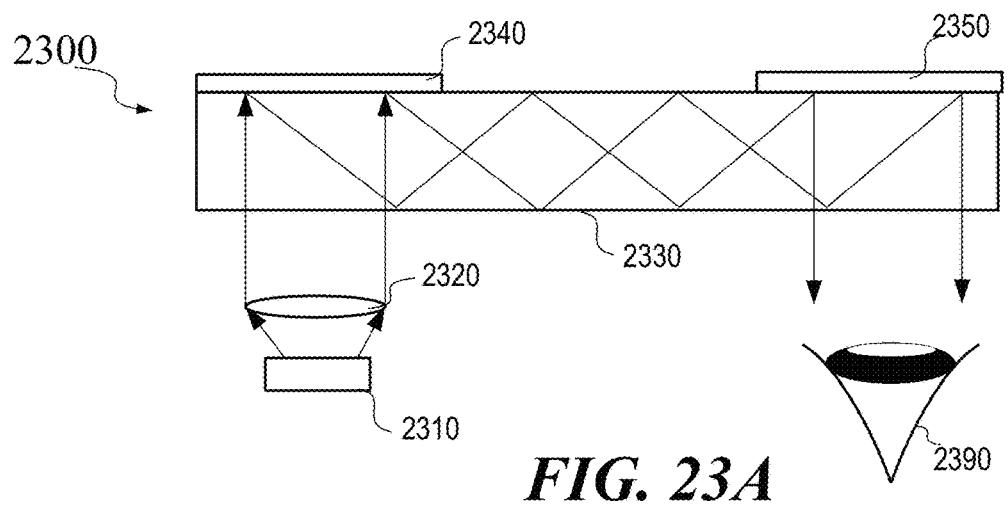
FIG. 23A illustrates an example of a waveguide display including achromatic couplers according to certain embodiments.

FIG. 23A illustrates an example of a waveguide display 2300 including achromatic couplers according to certain embodiments. Waveguide display 2300 may include a light source 2310, such as a micro-LED array or an LCD display, that may generate display light for an image. The display light generated by light source 2310 may be collimated or otherwise projected onto a waveguide 2330. In some embodiments, the display light may be polarized, for example, by a circular polarizer into right-handed or left-handed circular polarization light. An input coupler 2340 may reflect the incident display light in multiple wavelengths to certain directions such that the reflected light may propagate within waveguide 2330 through total internal reflection. Input coupler 2340 may include an achromatic reflective beam deflector described above, for example, with respect to FIG. 21B, and may deflect display light (e.g., circularly polarized display light) in multiple wavelengths and incident from a certain angle to a same desired direction. The display light coupled into waveguide 2330 and propagating within waveguide 2330 may be at least partially coupled out of waveguide 2330 towards a user's eye 2390 by an output coupler 2350. Output coupler 2350 may also include an achromatic reflective beam deflector described above, for example, with respect to FIG. 21B, and may deflect display light (e.g., circularly polarized display light) in multiple wavelengths and incident from a certain angle to a same desired direction towards user's eye 2390.

Figure 23B:
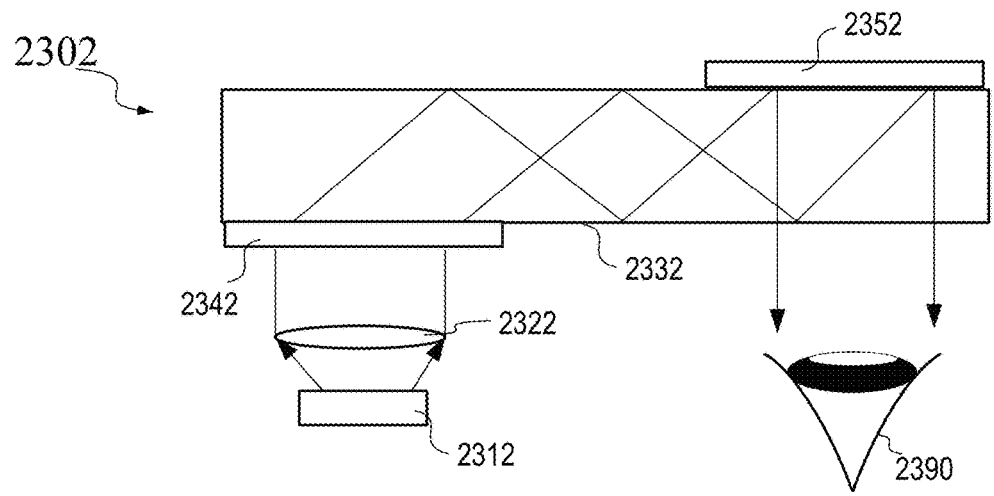
FIG. 23B illustrates another example of a waveguide display including achromatic couplers according to certain embodiments.

FIG. 23B illustrates another example of a waveguide display 2302 including achromatic couplers according to certain embodiments. Waveguide display 2302 may include a light source 2312, such as a micro-LED array or an LCD display, that may generate display light for an image. The display light generated by light source 2312 may be collimated or otherwise projected onto a waveguide 2332. In some embodiments, the display light may be polarized, for example, by a circular polarizer into right-handed or left-handed circular polarization light. An input coupler 2342 may deflect the incident display light in multiple wavelengths to certain directions such that the deflected light may propagate within waveguide 2332 through total internal reflection. Input coupler 2342 may include an achromatic transmissive beam deflector described above, for example, with respect to FIG. 22A, and may deflect display light (e.g., circularly polarized display light) in multiple wavelengths and incident from a certain angle to a same desired direction. The display light coupled into waveguide 2332 and propagating within waveguide 2332 may be at least partially coupled out of waveguide 2332 towards user's eye 2390 by an output coupler 2352. Output coupler 2352 may include an achromatic reflective beam deflector described above, for example, with respect to FIG. 21B, and may deflect display light (e.g., circularly polarized display light) in multiple wavelengths and incident from a certain angle to a same desired direction towards user's eye 2390.

Figure 23C:
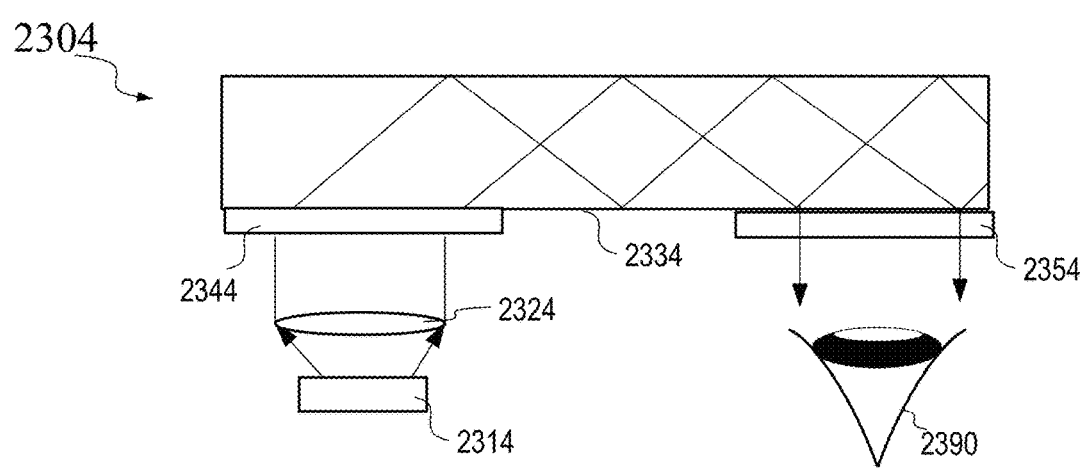
FIG. 23C illustrates another example of a waveguide display including achromatic couplers according to certain embodiments.

FIG. 23C illustrates yet another example of a waveguide display 2304 including achromatic couplers according to certain embodiments. Waveguide display 2304 may include a light source 2314, such as a micro-LED array or an LCD display, that may generate display light for an image. The display light generated by light source 2314 may be collimated or otherwise projected onto a waveguide 2334. In some embodiments, the display light may be polarized, for example, by a circular polarizer into right-handed or left-handed circular polarization light. An input coupler 2344 may deflect the incident display light in multiple wavelengths to certain directions such that the deflected light may propagate within waveguide 2334 through total internal reflection. Input coupler 2344 may include an achromatic transmissive beam deflector described above, for example, with respect to FIG. 22A, and may deflect display light (e.g., circularly polarized display light) in multiple wavelengths and incident from a certain angle to a same desired direction. The display light coupled into waveguide 2334 and propagating within waveguide 2334 may be at least partially coupled out of waveguide 2334 by an output coupler 2354 towards user's eye 2390. Output coupler 2352 may also include an achromatic transmissive beam deflector described above, for example, with respect to FIG. 22A, and may deflect display light (e.g., circularly polarized display light) in multiple wavelengths and incident from a certain angle to a same desired direction towards user's eye 2390.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 24:
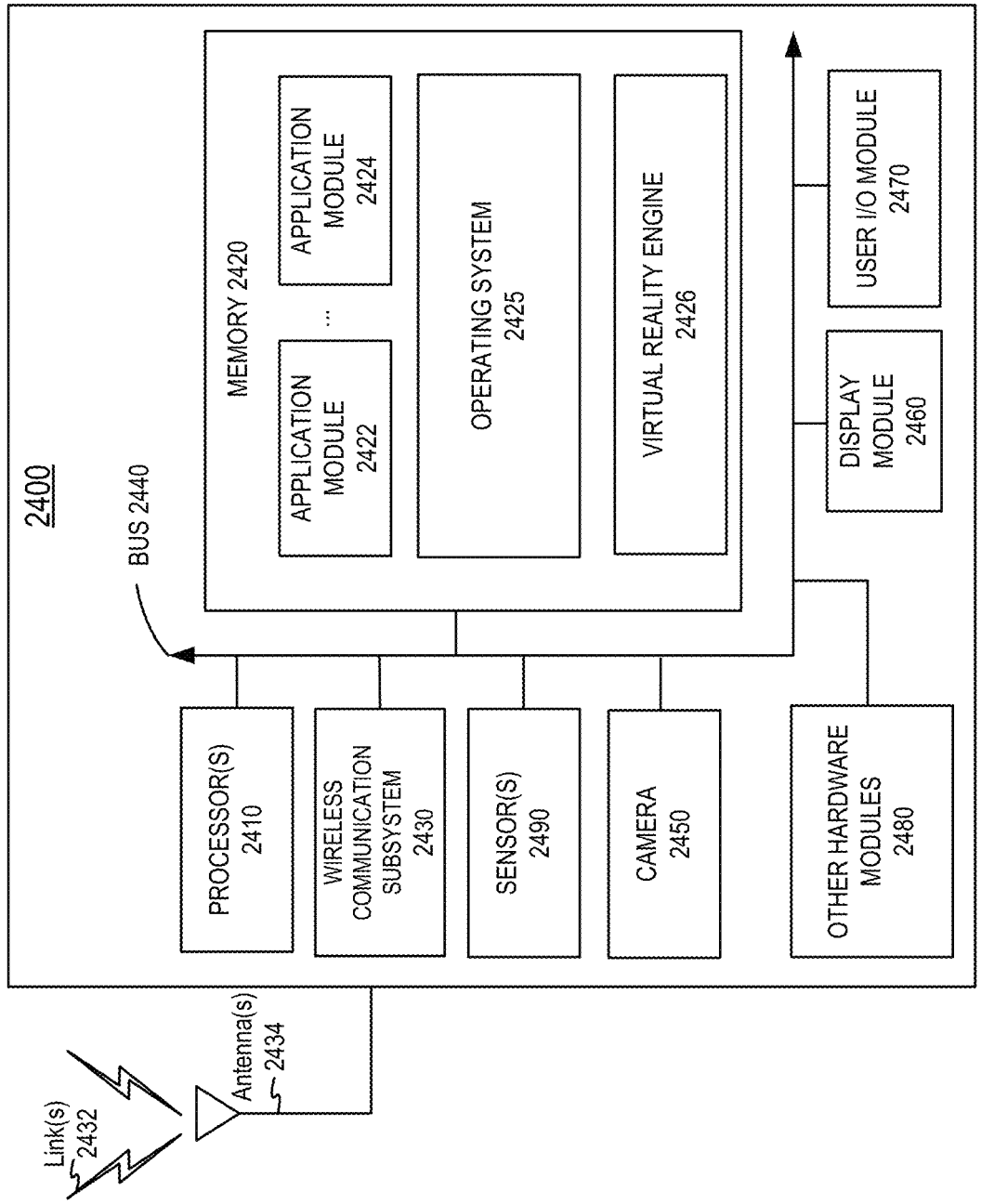
FIG. 24 is a simplified block diagram of an example of an electronic system in an example of a near-eye display according to certain embodiments.

FIG. 24 is a simplified block diagram of an example of an electronic system 2400 of an example near-eye display (e.g., HMD device) for implementing some of the examples disclosed herein. Electronic system 2400 may be used as the electronic system of an HMD device or other near-eye displays described above. In this example, electronic system 2400 may include one or more processor(s) 2410 and a memory 2420. Processor(s) 2410 may be configured to execute instructions for performing operations at a number of components, and can be, for example, a general-purpose processor or microprocessor suitable for implementation within a portable electronic device. Processor(s) 2410 may be communicatively coupled with a plurality of components within electronic system 2400. To realize this communicative coupling, processor(s) 2410 may communicate with the other illustrated components across a bus 2440. Bus 2440 may be any subsystem adapted to transfer data within electronic system 2400. Bus 2440 may include a plurality of computer buses and additional circuitry to transfer data.

Memory 2420 may be coupled to processor(s) 2410. In some embodiments, memory 2420 may offer both short-term and long-term storage and may be divided into several units. Memory 2420 may be volatile, such as static random access memory (SRAM) and/or dynamic random access memory (DRAM) and/or non-volatile, such as read-only memory (ROM), flash memory, and the like. Furthermore, memory 2420 may include removable storage devices, such as secure digital (SD) cards. Memory 2420 may provide storage of computer-readable instructions, data structures, program modules, and other data for electronic system 2400. In some embodiments, memory 2420 may be distributed into different hardware modules. A set of instructions and/or code might be stored on memory 2420. The instructions might take the form of executable code that may be executable by electronic system 2400, and/or might take the form of source and/or installable code, which, upon compilation and/or installation on electronic system 2400 (e.g., using any of a variety of generally available compilers, installation programs, compression/decompression utilities, etc.), may take the form of executable code.

In some embodiments, memory 2420 may store a plurality of application modules 2422 through 2424, which may include any number of applications. Examples of applications may include gaming applications, conferencing applications, video playback applications, or other suitable applications. The applications may include a depth sensing function or eye tracking function. Application modules 2422-2424 may include particular instructions to be executed by processor(s) 2410. In some embodiments, certain applications or parts of application modules 2422-2424 may be executable by other hardware modules 2480. In certain embodiments, memory 2420 may additionally include secure memory, which may include additional security controls to prevent copying or other unauthorized access to secure information.

In some embodiments, memory 2420 may include an operating system 2425 loaded therein. Operating system 2425 may be operable to initiate the execution of the instructions provided by application modules 2422-2424 and/or manage other hardware modules 2480 as well as interfaces with a wireless communication subsystem 2430 which may include one or more wireless transceivers. Operating system 2425 may be adapted to perform other operations across the components of electronic system 2400 including threading, resource management, data storage control and other similar functionality.

Wireless communication subsystem 2430 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2400 may include one or more antennas 2434 for wireless communication as part of wireless communication subsystem 2430 or as a separate component coupled to any portion of the system. Depending on desired functionality, wireless communication subsystem 2430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2430 may permit data to be exchanged with a network, other computer systems, and/or any other devices described herein. Wireless communication subsystem 2430 may include a means for transmitting or receiving data, such as identifiers of HMD devices, position data, a geographic map, a heat map, photos, or videos, using antenna(s) 2434 and wireless link(s) 2432. Wireless communication subsystem 2430, processor(s) 2410, and memory 2420 may together comprise at least a part of one or more of a means for performing some functions disclosed herein.

Embodiments of electronic system 2400 may also include one or more sensors 2490. Sensor(s) 2490 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2490 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2400 may include a display module 2460. Display module 2460 may be a near-eye display, and may graphically present information, such as images, videos, and various instructions, from electronic system 2400 to a user. Such information may be derived from one or more application modules 2422-2424, virtual reality engine 2426, one or more other hardware modules 2480, a combination thereof, or any other suitable means for resolving graphical content for the user (e.g., by operating system 2425). Display module 2460 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2400 may include a user input/output module 2470. User input/output module 2470 may allow a user to send action requests to electronic system 2400. An action request may be a request to perform a particular action. For example, an action request may be to start or end an application or to perform a particular action within the application. User input/output module 2470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2400. In some embodiments, user input/output module 2470 may provide haptic feedback to the user in accordance with instructions received from electronic system 2400. For example, the haptic feedback may be provided when an action request is received or has been performed.

Electronic system 2400 may include a camera 2450 that may be used to take photos or videos of a user, for example, for tracking the user's eye position. Camera 2450 may also be used to take photos or videos of the environment, for example, for VR, AR, or MR applications. Camera 2450 may include, for example, a complementary metal—oxide—semiconductor (CMOS) image sensor with a few millions or tens of millions of pixels. In some implementations, camera 2450 may include two or more cameras that may be used to capture 3-D images.

In some embodiments, electronic system 2400 may include a plurality of other hardware modules 2480. Each of other hardware modules 2480 may be a physical module within electronic system 2400. While each of other hardware modules 2480 may be permanently configured as a structure, some of other hardware modules 2480 may be temporarily configured to perform specific functions or temporarily activated. Examples of other hardware modules 2480 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2480 may be implemented in software.

In some embodiments, memory 2420 of electronic system 2400 may also store a virtual reality engine 2426. Virtual reality engine 2426 may execute applications within electronic system 2400 and receive position information, acceleration information, velocity information, predicted future positions, or some combination thereof of the HMD device from the various sensors. In some embodiments, the information received by virtual reality engine 2426 may be used for producing a signal (e.g., display instructions) to display module 2460. For example, if the received information indicates that the user has looked to the left, virtual reality engine 2426 may generate content for the HMD device that mirrors the user's movement in a virtual environment. Additionally, virtual reality engine 2426 may perform an action within an application in response to an action request received from user input/output module 2470 and provide feedback to the user. The provided feedback may be visual, audible, or haptic feedback. In some implementations, processor(s) 2410 may include one or more GPUs that may execute virtual reality engine 2426.

In various implementations, the above-described hardware and modules may be implemented on a single device or on multiple devices that can communicate with one another using wired or wireless connections. For example, in some implementations, some components or modules, such as GPUs, virtual reality engine 2426, and applications (e.g., tracking application), may be implemented on a console separate from the head-mounted display device. In some implementations, one console may be connected to or support more than one HMD.

In alternative configurations, different and/or additional components may be included in electronic system 2400. Similarly, functionality of one or more of the components can be distributed among the components in a manner different from the manner described above. For example, in some embodiments, electronic system 2400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, and the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical device comprising:
    an optical component having a uniform thickness and configured to modify a wavefront of a light beam that includes light in two or more wavelengths visible to human eyes, wherein the optical component has a chromatic aberration between the two or more wavelengths; and
    a metasurface on the optical component, the metasurface including a plurality of nanostructures configured to modify respective phases of incident light at a plurality of regions of the metasurface,
    wherein the plurality of nanostructures is configured to, at each region of the plurality of regions, add a respective phase delay for each of the two or more wavelengths to correct the chromatic aberration between the two or more wavelengths.

2. The optical device of claim 1, wherein the optical component comprises a reflective polarization volume hologram, a transmissive polarization volume hologram, a geometric phase device, a transmissive polarization-insensitive diffractive optical element, a reflective polarization-insensitive diffractive optical element, or a combination thereof.

3. The optical device of claim 1, wherein the optical component is characterized by an optical efficiency greater than 50% for circularly polarized light in the two or more wavelengths.

4. The optical device of claim 1, wherein the optical component comprises:
    a first substrate;
    a second substrate; and
    a layer of a birefringent material between the first substrate and the second substrate, wherein the layer of the birefringent material includes helical structures formed by birefringent material molecules of the birefringent material.

5. The optical device of claim 4, wherein:
    at least one of the first substrate or the second substrate includes an alignment pattern formed thereon; and
    the birefringent material molecules are oriented according to the alignment pattern.

6. The optical device of claim 4, wherein the metasurface is formed on a surface of at least one of the first substrate or the second substrate.

7. The optical device of claim 1, wherein the plurality of nanostructures includes a semiconductor material, a dielectric material characterized by a refractive index greater than 2.0, or a metal material.

8. The optical device of claim 1, wherein two or more nanostructures in the plurality of nanostructures have at least one of different respective lateral areas, different respective lateral shapes, or different respective orientations.

9. An optical device comprising:
    a polarization volume hologram including a layer of a birefringent material and configured to diffract polarized light in two or more wavelengths; and
    a metasurface on the polarization volume hologram, the metasurface including a plurality of nanostructures configured to modify respective phases of incident light at a plurality of regions of the metasurface,
    wherein the plurality of nanostructures of the metasurface is configured to, at each region of the plurality of regions, add a respective phase delay for each of the two or more wavelengths to correct a chromatic aberration of the polarization volume hologram at the two or more wavelengths.

10. The optical device of claim 9, wherein the polarization volume hologram comprises:
    a first substrate;
    a second substrate; and
    the layer of the birefringent material between the first substrate and the second substrate, wherein the layer of the birefringent material includes helical structures formed by birefringent material molecules of the birefringent material.

11. The optical device of claim 10, wherein the metasurface is formed on a surface of at least one of the first substrate or the second substrate.

12. The optical device of claim 10, wherein:
    at least one of the first substrate or the second substrate includes an alignment pattern formed thereon; and
    the birefringent material molecules are oriented according to the alignment pattern to form the helical structures.

13. The optical device of claim 9, wherein the birefringent material includes liquid crystal molecules and a chiral dopant.

14. The optical device of claim 9, wherein the polarization volume hologram is configured to diffract only right-handed or left-handed circularly polarized light.

15. The optical device of claim 9, wherein:
nanostructures in the plurality of nanostructures have a same height; and
two or more nanostructures in the plurality of nanostructures have at least one of different respective lateral areas, different respective lateral shapes, or different respective orientations.

16. The optical device of claim 9, wherein the polarization volume hologram includes a reflective polarization volume hologram or a transmissive polarization volume hologram.

17. The optical device of claim 9, wherein the optical device is characterized by a phase profile of a lens, a lens array, an off-axis lens, a prism, a grating, a freeform optical component, or a combination thereof.

* * * * *